US012699457B2

(12) United States Patent
Sung et al.

(10) Patent No.: US 12,699,457 B2
(45) Date of Patent: Aug. 4, 2026

(54) VIBRATION APPARATUS, AND DISPLAY APPARATUS AND VEHICULAR APPARATUS COMPRISING THE SAME

(71) Applicant: LG Display Co., Ltd., Seoul (KR)

(72) Inventors: Seunghyun Sung, Paju-si (KR); YuSeon Kho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/922,917

(22) Filed: Oct. 22, 2024

(65) Prior Publication Data

US 2025/0208714 A1 Jun. 26, 2025

(30) Foreign Application Priority Data

Dec. 26, 2023 (KR) ......................... 10-2023-0191633

(51) Int. Cl.
*G06F 3/01* (2006.01)
*B06B 1/06* (2006.01)
*B60K 35/25* (2024.01)

(52) U.S. Cl.
CPC ............ *G06F 3/016* (2013.01); *B06B 1/0629* (2013.01); *B60K 35/25* (2024.01)

(58) Field of Classification Search
CPC ......... G06F 3/016; B06B 1/0629; B06B 3/00; B60K 35/25; B60K 2360/1438; B60K 35/22; B60K 35/28; B60K 35/60; B60K 2360/164; G10K 9/125; H10N 30/04; B60Y 2400/92
See application file for complete search history.

(56) References Cited

U.S. PATENT DOCUMENTS

| | | | | |
|---|---|---|---|---|
| 8,680,746 B2 * | 3/2014 | Takahashi | .............. | H04R 17/00 |
| | | | | 310/323.02 |
| 10,007,340 B2 * | 6/2018 | Cruz-Hernandez | ..... | G06F 3/016 |
| 11,376,629 B2 * | 7/2022 | Salzmann | ............... | G06F 3/016 |
| 11,638,076 B2 * | 4/2023 | Noh | ......................... | G06F 3/016 |
| | | | | 455/566 |
| 11,647,317 B2 * | 5/2023 | Choi | ...................... | H04R 1/028 |
| | | | | 381/388 |
| 11,671,750 B2 * | 6/2023 | Kim | ......................... | H04R 3/12 |
| | | | | 381/333 |
| 2004/0251782 A1 * | 12/2004 | Johansson | ............ | H02N 2/0015 |
| | | | | 310/328 |
| 2009/0273583 A1 * | 11/2009 | Norhammar | .......... | G06F 3/0436 |
| | | | | 345/177 |

(Continued)

FOREIGN PATENT DOCUMENTS

| | | |
|---|---|---|
| CN | 107847978 A | 3/2018 |
| CN | 113198713 A | 8/2021 |

(Continued)

*Primary Examiner* — Ibrahim A Khan
(74) *Attorney, Agent, or Firm* — Seed Intellectual Property Law Group LLP

(57) ABSTRACT

Vibration apparatus, and display apparatus and vehicular apparatus comprising the same are disclosed. A vibration apparatus according to one or more aspects of the present disclosure may comprise a plurality of vibration transfer parts, a connection portion connected between the plurality of vibration transfer parts, and a plurality of vibration generating parts connected between two adjacent vibration transfer parts of the plurality of vibration transfer parts.

17 Claims, 14 Drawing Sheets

(56)                    References Cited

U.S. PATENT DOCUMENTS

| | | | | |
|---|---|---|---|---|
| 2012/0026103 | A1* | 2/2012 | Woo | H02N 2/005 |
| | | | | 345/173 |
| 2012/0139850 | A1* | 6/2012 | Kim | G06F 3/016 |
| | | | | 345/173 |
| 2012/0242593 | A1* | 9/2012 | Kim | H10N 30/2041 |
| | | | | 345/173 |
| 2013/0321299 | A1* | 12/2013 | Kim | G06F 3/016 |
| | | | | 345/173 |
| 2014/0347283 | A1* | 11/2014 | Kim | G06F 3/016 |
| | | | | 345/173 |
| 2018/0224998 | A1* | 8/2018 | Morofuji | G06F 3/0488 |
| 2018/0335845 | A1* | 11/2018 | Matsunami | G06F 3/03547 |
| 2019/0012030 | A1* | 1/2019 | Morofuji | G08B 6/00 |
| 2019/0025920 | A1* | 1/2019 | Takeda | G06F 3/016 |
| 2019/0302892 | A1* | 10/2019 | Takei | G06F 3/016 |
| 2019/0377414 | A1* | 12/2019 | Takeda | G06F 3/0414 |
| 2020/0059733 | A1* | 2/2020 | Shin | H04R 17/00 |
| 2020/0201437 | A1* | 6/2020 | Saboune | G06F 3/04883 |
| 2021/0183966 | A1* | 6/2021 | Kho | G06F 3/016 |
| 2021/0237121 | A1* | 8/2021 | Salzmann | B06B 1/0644 |
| 2022/0069194 | A1* | 3/2022 | Lee | H04R 7/045 |
| 2022/0210529 | A1* | 6/2022 | Nam | H04R 1/403 |
| 2024/0174964 | A1* | 5/2024 | Okamoto | C12M 33/08 |

FOREIGN PATENT DOCUMENTS

| | | | |
|---|---|---|---|
| CN | 117278915 | A | 12/2023 |
| TW | 202211694 | A | 3/2022 |
| WO | 2023159440 | A1 | 8/2023 |

* cited by examiner

ITM: DIS2, DIS3, DIS4, DIS5

VIBRATION APPARATUS, AND DISPLAY APPARATUS AND VEHICULAR APPARATUS COMPRISING THE SAME

CROSS-REFERENCE TO RELATED APPLICATIONS

This application claims the benefit of the Korean Patent Application No. 10-2023-0191633 filed on Dec. 26, 2023, which is hereby incorporated by reference as if fully set forth herein.

BACKGROUND

Technical Field

The present disclosure relates to a vibration apparatus, a display apparatus including the same, and a vehicular apparatus including the vibration apparatus.

Description of the Related Art

As information-oriented society advances, the needs for display apparatuses for displaying an image are variously increasing.

Electronic devices using a display apparatus as a display screen provide a user interface of a touch screen type, for convenience of a user input. Display apparatuses capable of touch interface processing are advancing to provide more various functions.

Display apparatuses including a touch panel or display apparatuses with touch screen integrated therein, which are capable of touch sensing based on a touch pen (e.g., a stylus pen) as well as finger touch sensing based on a finger, are being widely used.

Recently, haptic technology, which provides a haptic feedback to a user when the user touches a screen of a display apparatus, is being developed. Display apparatuses to which the haptic technology is applied generate an attractive force for stimulating a tangoreceptor of a human body, and stimulate a tactile sense of a user by using the attractive force, thereby enabling the user to recognize a touch and a texture of the touch.

BRIEF SUMMARY

The inventors of the present disclosure have recognized the issues and disadvantages of the related art and have performed research and experiments for implementing a vibration apparatus and an apparatus including the same, which may provide an ultrasonic vibration or an ultrasonic haptic to a user when a user touch is applied thereto. Based on the extensive research and experiments, the inventors of the present disclosure have provided various embodiments of a new vibration apparatus, a display apparatus including the same, and a vehicular apparatus including the vibration apparatus, which may provide an ultrasonic vibration or an ultrasonic haptic to a user.

Accordingly, aspects of the present disclosure are directed to a vibration apparatus, a display apparatus including the same, and a vehicular apparatus including the vibration apparatus that substantially obviates one or more of the problems due to limitations and disadvantages of the related art.

One or more aspects of the present disclosure are directed to providing a vibration apparatus, a display apparatus including the same, and a vehicular apparatus including the vibration apparatus, which may increase an intensity of an ultrasonic generated based on a vibration of a display member.

One or more aspects of the present disclosure are directed to providing a vibration apparatus, a display apparatus including the same, and a vehicular apparatus including the display apparatus, which may generate an out-plane vibration mode.

One or more aspects of the present disclosure is directed to providing a vibration apparatus, a display apparatus including the same, and a vehicular apparatus including the vibration apparatus, which may vibrate a display member in an out-plane vibration mode to provide an ultrasonic vibration and/or an ultrasonic haptic to a user.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a vibration apparatus comprises a plurality of vibration transfer parts, a connection portion connected between the plurality of vibration transfer parts, and a plurality of vibration generating parts connected between two adjacent vibration transfer parts of the plurality of vibration transfer parts.

In one or more aspects, a display apparatus comprises a display member configured to display an image, a vibration generating apparatus including one or more vibration apparatuses configured to vibrate the display member, and a connection member between the display member and the vibration generating apparatus. The one or more vibration apparatuses comprises a plurality of vibration transfer parts, a connection portion connected between the plurality of vibration transfer parts, and a plurality of vibration generating parts connected between two adjacent vibration transfer parts of the plurality of vibration transfer parts.

In one or more aspects, a vehicular apparatus comprises a dashboard, an instrument panel module in the dashboard, the instrument panel module including a first display, a driver seat, a front passenger seat, and an infortainment module in one or more of the dashboard, the driver seat, and the front passenger seat, and the infortainment module including one or more second displays. One or more of the first display and the one or more second displays comprise a display member configured to display an image, one or more vibration generating apparatuses configured to vibrate the display member, and a connection member between the display member and the one or more vibration generating apparatuses. The one or more vibration generating apparatuses comprise a plurality of vibration transfer parts, a connection portion connected between the plurality of vibration transfer parts, and a plurality of vibration generating parts connected between two adjacent vibration transfer parts of the plurality of vibration transfer parts.

According to one or more aspects of the present disclosure, a vibration apparatus may generate an out-plane vibration mode.

According to one or more aspects of the present disclosure, an apparatus and a vehicular apparatus each including a vibration apparatus may vibrate a display member in an out-plane vibration mode of the vibration apparatus to provide an ultrasonic vibration or an ultrasonic haptic to a user.

According to one or more aspects of the present disclosure, by using a base member and a vibration transfer member of a vibration transfer part, an in-plane vibration mode based on a vibration of a vibration generating part may be converted into an out-plane vibration mode to vibrate a display member, and thus, an ultrasonic vibration or an ultrasonic haptic may be provided to a user.

According to one or more aspects of the present disclosure, a vibration apparatus may vibrate a display member by using a connection portion connecting a plurality of vibration transfer parts with each other, and thus, may more effectively provide a user with an ultrasound vibration and/or an ultrasound haptic.

According to one or more aspects of the present disclosure, a connection process (or attachment process) and connection quality (or attachment performance) between a display member and a vibration apparatus may be improved.

According to one or more aspects of the present disclosure, as a signal supply member and a vibration apparatus are provided as one body, the signal supply member and the vibration apparatus may be configured as one part (or one component), and thus, an effect of uni-materialization may be obtained.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following detailed description are exemplary and explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate aspects of the disclosure and together with the description serve to explain the principle of the disclosure. In the drawings:

FIG. 7 is a diagram illustrating a display apparatus according to another aspect of the present disclosure;

DETAILED DESCRIPTION

Figure 1:
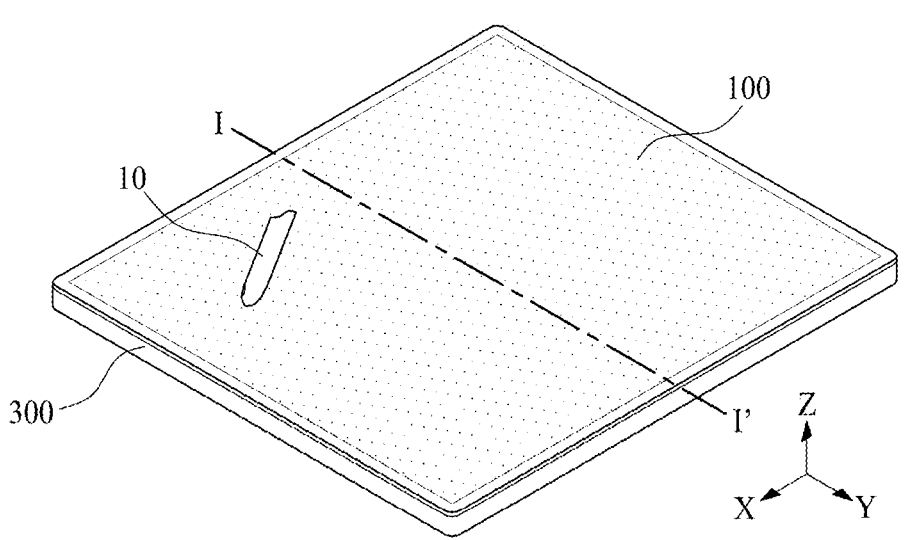
FIG. 1 is a perspective view illustrating a display apparatus according to an aspect of the present disclosure.

Reference is now made in detail to aspects of the present disclosure, examples of which may be illustrated in the accompanying drawings. In the following description, when a detailed description of well-known functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings, are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where a term like "comprise," "have," "include," "contain," "constitute," "made of," "formed of," or the like is used with respect to one or more elements, one or more other elements may be added unless a term such as "only" or the like is used. The terms used in the present disclosure are merely used in order to describe example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. "Aspects," "examples," and the like should not be construed as preferred or advantageous over other implementations. An aspect, an example, an example aspect, the aspect, or the like may refer to one or more aspects, one or more examples, one or more example aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range (e.g., 5%) may be caused by various factors (e.g., process factors, internal or external impact, noise, or the like). In interpreting a numerical value, the value is interpreted as including an error range unless explicitly stated otherwise.

In describing a positional relationship between two parts (e.g., layers, films, regions, components, sections, or the like), for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phrase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item", may represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combinations of A, B, and C (e.g., A and B; A and C; or B and C); and all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

X-axis direction", "Y-axis direction" and "Z-axis direction" should not be construed by a geometric relation only of a mutual vertical relation and may have broader directionality within the range that elements of the present disclosure may act functionally.

In the present disclosure, "a display apparatus" may include a display apparatus such as display modules (or display members) including a display panel and a driver for driving the display panel. Moreover, the display modules may include a set device (or a set apparatus) or a set electronic device such as a notebook computer, a TV, a computer monitor, an equipment apparatus including an automotive apparatus or another type of apparatus for vehicles, or a mobile electronic device such as a smartphone or an electronic pad, which is a complete product (or a final product) including display modules such as a liquid crystal display module and a light emitting display module (for example, a quantum dot light emitting display module, an organic light emitting display module) or the like.

Therefore, in the present disclosure, examples of the apparatus may include a display apparatus itself, such as a liquid crystal display module or an organic light emitting display module, or the like, and a set device which is a final consumer device or an application product including the liquid crystal display module or the organic light emitting display module, or the like.

A display panel applied to one or more aspects of the present disclosure may use any types of display panels such as a liquid crystal display panel, an organic light emitting display panel, a micro light emitting diode display panel, a quantum dot light emitting display module, or the like, but aspects of the present disclosure are not limited. For example, the display panel may be a display panel capable of generating (or outputting) one or more of a sound and a vibration by being vibrated by a vibration apparatus according to an aspect of the present disclosure. A display panel applied to a display apparatus according to an aspect of the present disclosure does not limit a shape or a size of the display panel. For example, a shape of the display panel may include rectangle, square, circle, oval, polygon, etc., and a size of the display panel may include a large-scale display panel, a small-scale display panel, a mini display panel, etc., without limited thereto.

According to one or more aspects of the present disclosure, when the display panel is the liquid crystal display panel, the liquid crystal display panel may include a plurality of gate lines, a plurality of data lines, and a plurality of pixels respectively provided in the intersection area of the gate lines and the data lines. Moreover, the liquid crystal display panel may be configured to include a first substrate including a thin film transistor (TFT) which is a switching element for adjusting a light transmittance of each of the plurality of pixels, a second substrate including a color filter and/or a black matrix or the like, and a liquid crystal layer between the first substrate and the second substrate.

According to another aspect of the present disclosure, when the display panel is the organic light emitting display panel, the organic light emitting display panel may include a plurality of gate lines, a plurality of data lines, and a plurality of pixels respectively provided in the intersection area of the gate lines and the data lines. Moreover, the organic light emitting display panel may include a substrate including a TFT which is an element for selectively applying a voltage to each of the plurality of pixels, an organic light emitting device layer on the substrate, and an encapsulation layer (or an encapsulation substrate) disposed at the substrate to cover the organic light emitting device layer, or the like. The encapsulation substrate may protect the TFT and the organic light emitting device layer or the like from an external impact such as an external force applied to the display apparatus when it is dropped or by a user and may prevent or reduce foreign matters such as moisture or oxygen from penetrating into the organic light emitting device layer. Furthermore, the organic light emitting device layer may further include an inorganic light emitting layer (for example, a nano-sized material layer and/or a quantum dot light emitting layer, or the like). As another aspect of the present disclosure, the organic light emitting device layer may be changed to a micro light emitting diode or a mini light emitting diode.

In the present disclosure, a display apparatus including a vibration apparatus may be applied to vehicles by being implemented as a user interface apparatus, such as a central control panel or the like in automobiles. For example, the user interface apparatus for vehicles may be configured between two front seats or other locations at the front of the vehicle so that a sound generated based on a vibration of the display module may be transmitted to interior of a vehicle. Therefore, an audio experience within a vehicle may be improved in comparison with a case where speakers are disposed at interior sides of the vehicle. Further, all the components of each vibration apparatus and each display apparatus having the vibration apparatus according to all exemplary aspects of the present disclosure are operatively coupled and configured.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

Figure 2:
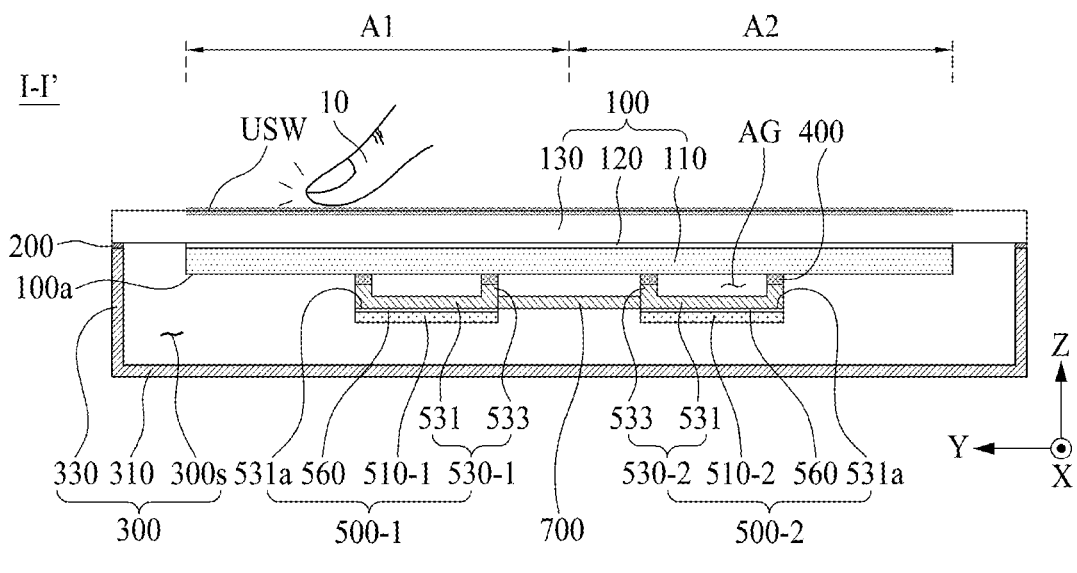
FIG. 2 is a cross-sectional view taken along line I-I' illustrated in FIG. 1 according to an aspect of the present disclosure.
Figure 3:
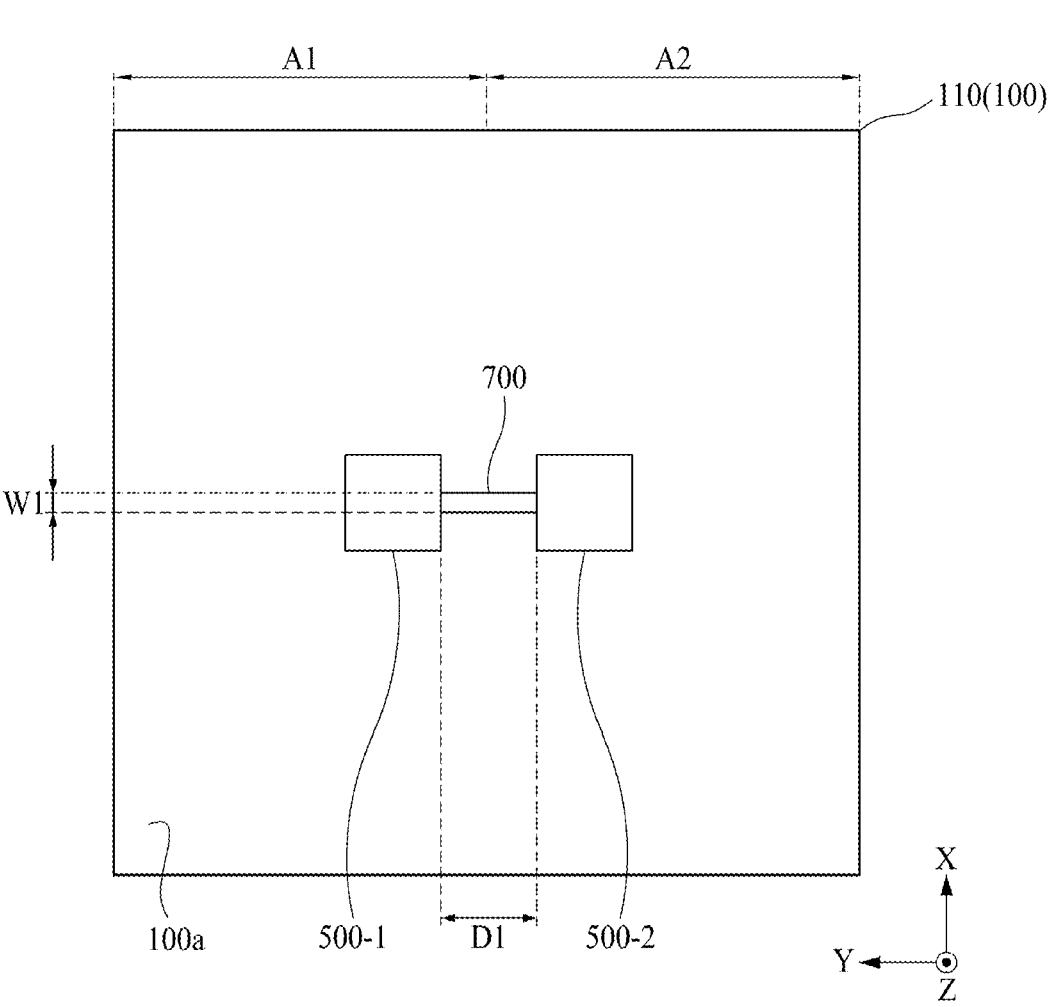
FIG. 3 is a rear view illustrating a plurality of vibration apparatuses and a display member illustrated in FIG. 1.

FIG. 1 is a perspective view illustrating a display apparatus according to an aspect of the present disclosure. FIG. 2 is a cross-sectional view taken along line I-I' illustrated in FIG. 1 according to an aspect of the present disclosure. FIG. 3 is a rear view illustrating a plurality of vibration apparatuses and a display member illustrated in FIG. 1.

Referring to FIGS. 1 to 3, a display apparatus according to an aspect (or a first aspect) of the present disclosure may be configured to sense one or more of a finger touch based on a finger 10 and a touch based on a touch pen (e.g., a stylus pen). For example, the display apparatus according to an aspect of the present disclosure may be a display apparatus added a touch panel or a display apparatus with touch screen integrated therein. For example, the display apparatus according to an aspect of the present disclosure may be used as a display apparatus for mobile electronic devices such as mobile phones, smartphones, smart glasses, smart watches, tablet personal computers (PCs), or watch phones, smart televisions, electronic whiteboards, bidirectional information transfer transparent displays, bidirectional digital signage, netbook computers, laptop computers, washing machines, monitors, or refrigerators, or the like, but aspects of the present disclosure are not limited thereto.

The display apparatus according to an aspect of the present disclosure may include a display member 100 and a vibration apparatus 500.

The display member 100 may be configured to display an image and output (or generate) an ultrasonic vibration or an ultrasonic haptic, based on a vibration of the vibration apparatus 500. For example, the display member 100 may be used as a vibration plate of the vibration apparatus 500.

The display member 100 may include a display panel 110 and a touch panel 120.

The display panel 110 may be configured to display an image. For example, the display panel 110 may include a plurality of pixels configured to display an image. The image may include an electronic image, a digital image, a still image, or a video image or the like. For example, the display panel 110 may be an organic light emitting display panel including a plurality of pixels which implement a black/ white or color image, but a type of display panel is not limited thereto. For example, the display panel 110 may include a liquid crystal display panel, an electrophoresis display panel, a micro light emitting diode display panel, a mini light emitting diode display panel, an electro-wetting display panel, an inorganic light emitting display panel such as a nano-sized material layer and/or a quantum dot light emitting display panel or the like. Hereinafter, an example where the display panel 110 is an organic light emitting display panel will be described, but aspects of the present disclosure are not limited thereto.

The organic light emitting display panel may include a base substrate, a display part, and a plate member.

The base substrate may be configured as including one or more of a glass material and a plastic material. The display part may include a pixel array part having a plurality of pixels which is disposed respectively at a pixel area provided by a plurality of gate lines and/or a plurality of data lines. Each of the plurality of pixels may include an organic light emitting layer. The plate member may be configured to cover the display part. The plate member may be attached to the display part by an adhesive member. The plate member may protect the display part or the display panel from an external impact such as an external force applied to the display apparatus when it is dropped or by a user and may prevent or reduce foreign matters such as moisture or oxygen from penetrating into the organic light emitting layer or the organic light emitting device layer.

The display panel 110 according to an aspect of the present disclosure may further include an encapsulation layer. The encapsulation layer may be configured between the display part and the adhesive member to directly surround the display part. The encapsulation layer may be configured to prevent or reduce foreign matters such as moisture or oxygen from penetrating into the organic light emitting layer or the organic light emitting device layer. The encapsulation layer may be formed in an inorganic material layer or an organic material layer, or may be formed in a multilayer structure where an inorganic material layer and an organic material layer are alternately stacked, but aspects of the present disclosure are not limited thereto. For example, the encapsulation layer may be omitted based on a structure of the display panel 110.

The touch panel (or a touch screen) 120 may be configured to sense a user touch applied to the display member 100. For example, the touch panel 120 may be configured to sense a user touch based on a touch pen (e.g., a stylus pen) or a finger 10. The touch panel 120 may be coupled, connected, or integrated with the display panel 110. For example, the display panel 110 may be an organic light emitting display panel with a touch screen integrated therein.

The touch panel 120 according to an aspect of the present disclosure may be configured to cover a front surface of the display panel 110. For example, the touch panel 120 may be disposed to cover a front surface of base substrate or a front surface of the plate member.

The touch panel 120 according to another aspect of the present disclosure may be configured between the display part of the display panel 110 and the plate member, but aspects of the present disclosure are not limited thereto. For example, the touch panel 120 may be disposed within the pixel array part of the display panel 110. In this case, the touch panel 120 may be an in-cell touch panel, a touch electrode layer, or a touch sensor layer, but aspects of the present disclosure are not limited thereto. The touch panel 120 may include an electrode structure corresponding to a mutual-capacitance type configured so that a plurality of touch driving electrodes and a plurality of touch sensing electrodes cross each other or a self-capacitance type configured with only a plurality of touch sensing electrodes, but aspects of the present disclosure are not limited thereto.

The display member 100 according to an aspect of the present disclosure may further include a front member 130 at the front surface of the display panel 110.

The front member 130 may configure a foremost structure of the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact such as an external force applied to the display apparatus when it is dropped or by a user. For example, the front member 130 may be disposed at a front surface of the touch panel 120. For example, the touch panel 120 may be disposed between the front member 130 and the display panel 110. For example, the touch panel 120 may be connected or attached to a rear surface of the front member 130.

The front member 130 according to an aspect of the present disclosure may include a transparent plastic material, a glass material, or a reinforced glass material, but aspects of the present disclosure are not limited thereto. For example, the front member 130 may include a front structure, a front window, a cover window, a glass window, a cover screen, a screen cover, or a window glass or the like, but aspects of the present disclosure are not limited thereto.

The display apparatus according to an aspect of the present disclosure may further include a supporting member 300. The supporting member 300 may be configured or disposed at a rear surface (or a rear surface side) 100a of the display member 100. The supporting member 300 may be configured to cover or surround the rear surface 100a of the display member 100.

The supporting member 300 may include an internal space 300s which covers the rear surface 100a of the display member 100. For example, the supporting member 300 may have a box shape where one side (or one portion or an upper side or an upper portion) of the internal space 300s is opened.

The supporting member 300 according to an aspect of the present disclosure may include a first supporting portion 310 and a second supporting portion 330.

The first supporting portion 310 may be at the rear surface (or a rear surface side) 100a of the display member 100. For example, the first supporting portion 310 may be configured to cover the rear surface 100a of the display member 100. For example, the first supporting portion 310 may be configured to cover an entire rear surface 100a of the display panel 110. The first supporting portion 310 may be spaced apart from the rear surface 100a of the display member 100 (or display panel 110). For example, the first supporting portion 310 may be spaced apart from the rear surface 100a of the display member 100 (or display panel 110) with an internal space 300s therebetween. For example, the first supporting portion 310 may be a bottom portion, a bottom plate, a supporting plate, a housing plate, or a housing bottom portion, or the like, but aspects of the present disclosure are not limited thereto.

The second supporting portion 330 may be at a periphery portion of the display member 100. For example, the second supporting portion 330 may be configured or disposed at a periphery portion of the rear surface 100a of the display member 100. For example, the second supporting portion 330 may be connected to a periphery portion of the first supporting portion 310. For example, the second supporting portion 330 may include a structure where the periphery portion of the first supporting portion 310 is bent. For example, the second supporting portion 330 may be a lateral portion, a sidewall, a supporting sidewall, a housing lateral surface, or a housing sidewall, or the like, but aspects of the present disclosure are not limited thereto.

The second supporting portion 330 may be integrated into the first supporting portion 310. For example, the first supporting portion 310 and the second supporting portion 330 may be integrated as one body. Accordingly, the internal space 300s surrounded by the second supporting portion 330 may be provided on the first supporting portion 310. Accordingly, the supporting member 300 may include a box shape where one side (or one portion such as an upper side or an upper portion) may be opened by the first supporting portion 310 and the second supporting portion 330.

The display apparatus according to an aspect of the present disclosure may further include a coupling member 200 between the display member 100 and the supporting member 300.

The supporting member 300 may be coupled to or connected to the display member 100 by the coupling member 200. The supporting member 300 may be connected or coupled to a rear periphery portion of the display member 100 by the coupling member 200. For example, the supporting member 300 may be connected or coupled to a rear periphery portion of the front member 130 by the coupling member 200, but aspects of the present disclosure are not limited thereto. For example, the supporting member 300 may be connected or coupled to a rear periphery portion of the front member 130 by the coupling member 200 and may be configured to surround lateral surfaces (or side surfaces) of each of the touch panel 120 and the display panel 110. For example, the supporting member 300 may surround all lateral surfaces of each of the touch panel 120, the display panel 110, and the vibration apparatus 500. For example, each of the touch panel 120, the display panel 110, and the vibration apparatus 500 may be accommodated (or inserted) into the internal space 300s of the supporting member 300.

According to an aspect of the present disclosure, the front member 130 of the display member 100 may be omitted. In this case, the coupling member 200 may be configured between the display panel 110 and the supporting member 300. For example, when the front member 130 is omitted, the coupling member 200 may be disposed between a rear periphery portion of the display panel 110 and a front periphery portion of the first supporting portion 310.

The vibration apparatus 500 may be configured at the rear surface (or a rear surface side) 100a of the display member 100. For example, the vibration apparatus 500 may be configured to vibrate the display member 100. For example, the vibration apparatus 500 may vibrate the display member 100 to generate (or output) an ultrasonic USW. The vibration apparatus 500 may vibrate based on a driving signal applied from a driving circuit part to shift or vibrate the display member 100, and thus, may generate (or output) an ultrasonic vibration or an ultrasonic haptic. For example, the vibration apparatus 500 may vibrate the display member 100 to generate (or output) the ultrasonic vibration to a surface (or screen) of the display member 100. For example, when a user touches the surface (or screen) of the display member 100 with a finger 10 or a touch pen (e.g. a stylus pen), the vibration apparatus 500 may generate (or output) the ultrasonic USW so that the user recognizes the ultrasonic vibration or the ultrasonic haptic through the finger 10 or the touch pen. For example, the finger 10 of the user or the touch pen (e.g. a stylus pen) may be a touch object. In the following descriptions, a touch object 10 may be the finger 10 of the user or the touch pen (e.g. a stylus pen).

The ultrasonic USW which is generated (or output) based on a vibration of the display member 100 caused by a vibration of the vibration apparatus 500 may generate a squeeze film effect. The squeeze film effect may be referred to as surface ultrasonic lubrication, and the surface ultrasonic lubrication may change a friction coefficient (or a friction force) between the touch object 10 and the display member 100 through changing of a surface friction coefficient of the display member 100 to implement fine texture or roughness recognizable by the user. Accordingly, when there is a user touch, the vibration apparatus 500 may generate the ultrasonic USW corresponding to a haptic driving signal to change the friction coefficient (or the friction force) between the touch object 10 and the display member 100, and thus, may provide a virtual texture effect to the touch object 10, thereby providing the user with a virtual texture which is equal or similar to an actual texture.

The vibration apparatus 500 according to an aspect of the present disclosure may be configured to generate an out-plane vibration mode. For example, the vibration apparatus 500 may vibrate the display member 100 in the out-plane vibration mode to provide an ultrasonic vibration or an ultrasonic haptic to a user. For example, the out-plane vibration mode may be a vertical-direction vibration, a thickness-direction vibration, or a longitudinal-direction vibration. For example, the out-plane vibration mode may be a vertical-direction vibration, a thickness-direction vibration, or a longitudinal-direction vibration with respect to the display member 100. For example, the display member 100 may be supplied with an out-plane vibration from the vibration apparatus 500 to vibrate (or displace or drive), and thus, may generate (or output) an ultrasonic USW.

The vibration apparatus 500 may be configured to include a piezoelectric material or an electroactive material which have a piezoelectric characteristic. For example, the vibration apparatus 500 may be an active vibration member, a vibration generating apparatus, a vibration generating device, an ultrasonic vibration apparatus, an ultrasonic generating apparatus, an ultrasonic generating device, a haptic vibration apparatus, a haptic vibration device, a haptic generating apparatus, or a haptic generating device, but aspects of the present disclosure are not limited thereto.

According to an aspect of the present disclosure, a vibration apparatus 500 may include a plurality of vibration generating apparatuses 500-1 and 500-2. For example, the vibration apparatus 500 may include a first vibration generating apparatus 500-1 and a second vibration generating apparatus 500-2. For example, the vibration apparatus 500 may include a plurality of ultrasound generating apparatuses 500-1 and 500-2 or first and second ultrasound generating apparatuses 500-1 and 500-2. For example, the display apparatus according to an aspect of the present disclosure may include a plurality of vibration apparatuses (or a vibration generating apparatus) 500 or the plurality of ultrasound generating apparatuses 500-1 and 500-2.

The first vibration generating apparatus 500-1 and the second vibration generating apparatus 500-2 may be configured to be connected to first and second regions (or rear regions) A1 and A2 of the display member 100.

In the display member 100, with respect to a second direction Y, the first region (or a first rear region) A1 may be an upper region or a top region of the display member 100.

In the display member 100, with respect to the second direction Y, the second region (or a second rear region) A2 may be a lower region or a bottom region of the display member 100. The display member 100 may include a plurality of haptic regions (or ultrasound generating regions) which respectively correspond to or overlap the first and second regions A1 and A2.

The first vibration generating apparatus 500-1 may be configured to generate (or output) an ultrasound vibration and/or an ultrasound haptic in the first region A1 of the display member 100. The first vibration generating apparatus 500-1 may vibrate based on a driving signal supplied from a driving circuit part to vibrate the first region A1 of the display member 100, and thus, may generate (or output) an ultrasound USW in the first region A1 of the display member 100.

The second vibration generating apparatus 500-2 may be configured to generate (or output) an ultrasound vibration and/or an ultrasound haptic in the second region A2 of the display member 100. The second vibration generating apparatus 500-2 may vibrate based on the driving signal supplied from the driving circuit part to vibrate the second region A2 of the display member 100, and thus, may generate (or output) an ultrasound USW in the second region A2 of the display member 100.

The vibration apparatus 500 according to an aspect of the present disclosure may include a plurality of vibration generating parts 510, a plurality of vibration transfer parts 530, and a connection portion 700.

The plurality of vibration generating parts 510 may include a first vibration generating part 510-1 and a second vibration generating part 510-2. The first vibration generating part 510-1 may be configured in the first vibration generating apparatus 500-1. The first vibration generating part 510-1 may be connected to the first vibration transfer part 530-1 by using an adhesive member 560. The second vibration generating part 510-2 may be configured in the second vibration generating apparatus 500-2. The second vibration generating part 510-2 may be connected to the second vibration transfer part 530-2 by using the adhesive member 560.

Each of the plurality of vibration generating parts 510 may include a piezoelectric material having a piezoelectric characteristic. Each of the plurality of vibration generating parts 510 may be configured as a ceramic-based piezoelectric material capable of implementing a relatively strong vibration, or may be configured as including a piezoelectric ceramic having a perovskite-based crystalline structure. For example, each of the plurality of vibration generating parts 510 may be a vibration device, a vibration generating device, a vibration film, a vibration generating film, a vibrator, a vibration generator, an active vibrator, an active vibration generator, an actuator, an exciter, a film actuator, a film exciter, an ultrasonic actuator, or an active vibration member, or the like, but aspects of the present disclosure are not limited thereto.

Each of the plurality of vibration generating parts 510 may autonomously vibrate (or displace or drive) based on a vibration (or displacement or driving) of the piezoelectric material based on a driving signal applied to the piezoelectric material. Each of the plurality of vibration generating parts 510 may alternately repeat contraction and/or expansion by a piezoelectric effect (or a piezoelectric characteristic) to vibrate (or displace or drive). For example, each of the plurality of vibration generating parts 510 may alternately and repeatedly perform contraction and/or expansion based on an inverse piezoelectric effect to vibrate (or displace or drive) in an in-plane vibration mode. For example, the in-plane vibration mode may be a horizontal-direction vibration or a lateral-direction vibration. For example, the in-plane vibration mode may be a horizontal-direction vibration or a lateral-direction vibration with respect to the display member 100.

Each of the plurality of vibration generating parts 510 may vibrate based on the driving signal to generate (or output) the ultrasonic USW having a frequency of 20 kHz or more. For example, the driving signal may be an ultrasonic driving signal or a haptic driving signal, but aspects of the present disclosure are not limited thereto.

The driving signal according to an aspect of the present disclosure may have a frequency of 20 kHz or more. For example, the driving signal may have a frequency which is a same as or different from a resonance frequency of each of the plurality of vibration generating parts 510, to generate ultrasonic resonance.

The driving signal according to another aspect of the present disclosure may include an ultrasonic signal and a texture signal, to provide a virtual texture using a squeeze film effect to the user. For example, the ultrasonic signal may have a frequency of 20 kHz or more. For example, the texture signal may have a low frequency signal or a virtual texture signal, and may have a frequency of 100 Hz to 600 Hz. For example, the texture signal may have one or more frequencies of 100 Hz to 600 Hz based on a texture (or surface roughness) of a textured object. For example, the textured object may include one or more materials of paper, plastic, rubber, leather, fur, fabric, cloth, glass, mirror, wood, or metal, or the like, but aspects of the present disclosure are not limited thereto.

The driving signal according to another aspect of the present disclosure may be an amplitude modulation signal of an ultrasonic signal using a low frequency signal, but aspects of the present disclosure are not limited thereto. For example, the driving signal may be generated by the amplitude modulation of the ultrasonic signal based on the low frequency signal of 100 Hz to 600 Hz, but aspects of the present disclosure are not limited thereto. Accordingly, a user may recognize a virtual texture corresponding to the frequency of the texture signal instead of a texture of the display member 100, based on a variation of the friction coefficient (or the friction force) between the display member 100 and the touch object 10 based on the ultrasonic USW included in a frequency of the texture signal.

The plurality of vibration transfer parts 530 may be configured to transfer vibrations of the plurality of vibration generating parts 510 to the display member 100. The plurality of vibration transfer parts 530 may be respectively connected to the plurality of vibration generating parts 510. The plurality of vibration transfer parts 530 may include a first vibration transfer part 530-1 and a second vibration transfer part 530-2.

According to an aspect of the present disclosure, the first vibration transfer part 530-1 may be configured in the first vibration generating apparatus 500-1. The first vibration transfer part 530-1 may be connected to the first vibration generating part 510-1. The first vibration transfer part 530-1 may be configured between a rear surface 100a of the display member 100 and the first vibration generating part 510-1. The first vibration transfer part 530-1 may transfer a vibration of the first vibration generating part 510-1 to the display member 100.

The first vibration transfer part 530-1 according to an aspect of the present disclosure may be configured to change an in-plane vibration mode (or a first vibration mode) of the first vibration generating part 510-1 to an out-plane vibration mode (or a second vibration mode). For example, the first vibration transfer part 530-1 may be configured to change the in-plane vibration mode, transferred to the display member 100, to the out-plane vibration mode, based on a vibration of the first vibration generating part 510-1. For example, the first vibration transfer part 530-1 may be configured to change the in-plane vibration mode based on a vibration of the first vibration generating part 510-1 to the out-plane vibration mode to transfer to the display member 100. For example, the first vibration transfer part 530-1 may be configured to change an ultrasound vibration (or a longitudinal vibration), transferred to the display member 100, to a thickness-direction vibration (or a transverse vibration) of the display member 100, based on the vibration of the first vibration generating part 510-1. For example, the first vibration transfer part 530-1 may change the vibration of the first vibration generating part 510-1 to the thickness-direction vibration (or the transverse vibration) of the display member 100 or a normal-direction vibration (or a longitudinal vibration) with respect to a surface of the first vibration generating part 510-1 to transfer to the display member 100, and thus, may increase (or maximize) the efficiency of a squeeze film effect generated based on a vibration of the display member 100.

The second vibration transfer part 530-2 may be configured in the second vibration generating apparatus 500-2. The second vibration transfer part 530-2 may be connected to the second vibration generating part 510-2. The second vibration transfer part 530-2 may be configured between the rear surface 100a of the display member 100 and the second vibration generating part 510-2. The second vibration transfer part 530-2 may transfer the vibration of the first vibration generating part 510-1 to the display member 100.

The second vibration transfer part 530-2 according to an aspect of the present disclosure may be configured to change an in-plane vibration mode (or a first vibration mode) of the second vibration generating part 510-2 to an out-plane vibration mode (or a second vibration mode). For example, the second vibration transfer part 530-2 may be configured to change the in-plane vibration mode, transferred to the display member 100, to the out-plane vibration mode, based on a vibration of the second vibration generating part 510-2. For example, the second vibration transfer part 530-2 may be configured to change the in-plane vibration mode based on a vibration of the second vibration generating part 510-2 to the out-plane vibration mode to transfer to the display member 100. For example, the second vibration transfer part 530-2 may be configured to change the ultrasound vibration (or the longitudinal vibration), transferred to the display member 100, to the thickness-direction vibration (or the transverse vibration) of the display member 100, based on the vibration of the second vibration generating part 510-2. For example, the second vibration transfer part 530-2 may change the vibration of the second vibration generating part 510-2 to the thickness-direction vibration (or the transverse vibration) of the display member 100 or a normal-direction vibration (or a longitudinal vibration) with respect to a surface of the second vibration generating part 510-2 to transfer to the display member 100, and thus, may increase (or maximize) the efficiency of the squeeze film effect generated based on the vibration of the display member 100.

According to an aspect of the present disclosure, each of the plurality of vibration transfer parts 530 may be a vibration conversion member, a vibration mode conversion member, or a converter, but aspects of the present disclosure are not limited thereto.

According to an aspect of the present disclosure, each of the plurality of vibration transfer parts 530 may be configured to include a material having relatively high stiffness or a material having a Young's modulus or a modulus of 1 GPa or more, to transfer vibrations of the one or more vibration generating parts 510 to the display member 100.

According to an aspect of the present disclosure, the vibration transfer part 530 according to an aspect of the present disclosure a metal material or a plastic material. For example, the metal material of the vibration transfer part 530 may include any one or more materials of stainless steel, aluminum (Al), an Al alloy, a magnesium (Mg), a Mg alloy, copper (Cu) alloy, and a magnesium-lithium (Mg—Li) alloy, but aspects of the present disclosure are not limited thereto. For example, the vibration transfer part 530 may be configured as a plastic material such as plastic or styrene material, but aspects of the present disclosure are not limited thereto. For example, the plastic material of the vibration transfer part 530 may be configured as polycarbonate (PC), polyethylene terephthalate (PET), polyarylate (PAR), polyethylene naphthalate (PEN), polysulfone (PSF), polyethersulfone (PES), or cyclo-olefin copolymer (COC), or the like, but aspects of the present disclosure are not limited thereto. For example, the styrene material may be an ABS material. The ABS material may be acrylonitrile, butadiene, and styrene.

According to an aspect of the present disclosure, the vibration apparatus 500 may include a connection portion 700. The connection portion 700 may be configured between a plurality of vibration generating apparatuses 500-1 and 500-2 adjacent to each other. The connection portion 700 may connect the plurality of vibration generating apparatuses 500-1 and 500-2 with each other. The connection portion 700 may connect the first vibration generating apparatus 500-1 to the second vibration generating apparatus 500-2.

According to an aspect of the present disclosure, the connection portion 700 may be configured between a plurality of vibration transfer parts 530 adjacent to each other. The connection portion 700 may connect the plurality of vibration transfer parts 530 with each other. The connection portion 700 may be configured between the first vibration transfer part 530-1 and the second vibration transfer part 530-2. The connection portion 700 may connect the first vibration transfer part 530-1 to the second vibration transfer part 530-2.

Referring to FIG. 3, the connection portion 700 may have a width W1 which is less than that of each of the first vibration transfer part 530-1 to the second vibration transfer part 530-2. For example, a length D1 of the connection portion 700 may be two or more times the width W1 of the connection portion 700, but aspects of the present disclosure are not limited thereto. As another example, a length of the connection portion 700 may be set to two times or three or more times a width of the connection portion 700 and may be adjusted based on a vibration apparatus. For example, the connection portion 700 may include the same material as that of the vibration transfer part 530, but aspects of the present disclosure are not limited thereto. For example, the connection portion 700 may be configured simultaneously with the vibration transfer part 530 by using the same process.

According to an aspect of the present disclosure, the vibration apparatus 500 may vibrate the display member 100 by using the connection portion 700 connecting the plurality of vibration transfer parts 530-1 and 530-2 with each other, and thus, may more effectively provide a user with an ultrasound vibration and/or an ultrasound haptic.

According to an aspect of the present disclosure, the plurality of vibration generating parts 510 may be adhered to or connected to a first surface (or rear surface) 531*a* of each of the plurality of vibration transfer part 530 by an adhesive member 560. For example, the adhesive member 560 may be a first connection member or a first adhesive member, but aspects of the present disclosure are not limited thereto.

The adhesive member 560 according to an aspect of the present disclosure may be a double-sided tape, an adhesive, a double-sided adhesive, bond, or a thermo-curable resin, or the like, but aspects of the present disclosure are not limited thereto. For example, the adhesive member 560 may include one or more of a thermo-curable adhesive, a photo-curable adhesive, and a thermal bonding adhesive (or a thermosetting adhesive). For example, the adhesive member 560 may include the thermal bonding adhesive. The thermal bonding adhesive may be a heat-active type or a thermo-curable type. For example, the adhesive member 560 including the thermal bonding adhesive may attach or couple the vibration generating part 510 and the vibration transfer part 530 by heat and pressure. For example, the adhesive member 560 including the thermal bonding adhesive (or the thermosetting adhesive) may minimize or reduce or prevent the loss of vibration of the vibration generating parts 510.

The adhesive member 560 according to another aspect of the present disclosure may include a vibration transfer particle. For example, the vibration transfer particle may reduce or prevent or minimize a loss of vibration transferred from the vibration generating part 510 to the vibration transfer part 530. For example, the vibration transfer particle may include piezoelectric materials (or metal materials, metal nanowires, or metal nanoparticles) included or added in an adhesive material such as a pressure sensitive adhesive (PSA), an optically cleared adhesive (OCA), or an optically cleared resin (OCR), but aspects of the present disclosure are limited thereto.

Each of a plurality of vibration apparatuses or the first and second vibration generating apparatuses 500-1 and 500-2 may be connected to or supported by the rear surface 100*a* of the display member 100 by using a connection member 400. For example, each of the plurality of vibration apparatuses or the first and second vibration generating apparatuses 500-1 and 500-2 may be connected to or supported by the rear surface 100*a* of the display panel 110 by using the connection member 400. For example, the plurality of vibration apparatuses or the first and second vibration generating apparatuses 500-1 and 500-2 may be configured in the same line. For example, the plurality of vibration apparatuses or the first and second vibration generating apparatuses 500-1 and 500-2 may be configured in the same line with respect to the second direction Y.

The vibration apparatus 500 or the vibration transfer part 530 according to an aspect of the present disclosure may be connected or coupled to the display member 100. For example, the vibration apparatus 500 or the vibration transfer part 530 may be connected to or supported at the rear surface 100*a* of the display member 100 by a connection member 400. For example, the vibration apparatus 500 or the vibration transfer part 530 may be partially (or locally) connected to or partially (or locally) supported at the rear surface 100*a* of the display panel 110 by the connection member 400. For example, the connection member 400 may be a second connection member or a second adhesive member, but aspects of the present disclosure are not limited thereto.

The connection member 400 may include a material or an adhesive material for preventing or reducing or minimizing the loss of a vibration (or vibration force or displacement force) transferred to the display member 100 from the vibration apparatus 500 or the vibration transfer part 530. For example, the connection member 400 may include a material or an adhesive material having a modulus or a Young's modulus which is equal or similar to the vibration transfer part 530, to transfer a vibration of the vibration transfer part 530 to the display member 100 without loss.

The connection member 400 according to an aspect of the present disclosure may have a modulus of 1 GPa (gigapascal) or more. For example, the connection member 400 may have a modulus of 1 GPa to 10 GPa, but aspects of the present disclosure are not limited thereto. For example, when the display apparatus according to an aspect of the present disclosure is applied to a vehicular apparatus (or vehicle) and the connection member 400 includes a material or an adhesive material having a modulus of 1 GPa or more, the transfer efficiency of a vibration force (or displacement force) transferred from the vibration apparatus 500 or the vibration transfer part 530 to the display member 100 may increase, and the transfer efficiency of a vibration force (or displacement force) transferred from the vibration apparatus 500 or the vibration transfer part 530 to the display member 100 may not decrease in a high temperature environment and a low temperature environment.

The material or the adhesive material of the connection member 400 according to an aspect of the present disclosure may include epoxy or cyanoacrylate, but aspects of the present disclosure are not limited thereto.

The material or the adhesive material of the connection member 400 according to another aspect of the present disclosure may include such as a pressure sensitive adhesive (PSA), an optically cleared adhesive (OCA), an optically cleared resin (OCR), an epoxy resin, an acrylic resin, a silicone resin, or a urethane resin, or the like, but aspects of the present disclosure are not limited thereto. For example, the connection member 400 may include an acrylic-based adhesive material (or substance) having a characteristic where an adhesive force is better and hardness is higher.

When the display apparatus according to an aspect of the present disclosure is applied to a non-vehicular apparatus instead of a vehicular apparatus, the connection member 400 according to another aspect of the present disclosure may have a modulus (or Young's modulus) of less than 1 GPa. For example, the connection member 400 may have a modulus of 10 MPa (megapascal) or less. For example, the connection member 400 may have a modulus of 1 MPa to 10 MPa, but aspects of the present disclosure are not limited thereto. For example, when the connection member 400 has a modulus of less than 1 GPa or 10 MPa or less, the connection member 400 may have a thickness of 1 nm (nanometer) or more and 1 mm (millimeter) or less so as to prevent or minimize or reduce the loss, caused by a relatively low modulus, of a vibration (or vibration force) transferred from the vibration apparatus 500 or the vibration transfer part 530 to the display member 100, but aspects of the present disclosure are not limited thereto. For example, the connection member 400 may include a double-sided adhesive, a double-sided tape, a double-sided foam tape, a double-sided foam pad, or an adhesive, or the like, but aspects of the present disclosure are not limited thereto.

The connection member 400 according to another aspect of the present disclosure may include a material or an adhesive material which is high in thermal conductance or large in thermal capacity, to dissipate heat, occurring in vibration of the vibration apparatus 500, to the display member 100. For example, the connection member 400 may be a heat dissipation member. For example, the connection member 400 may include a heat transfer particle. For example, the heat transfer particle may increase a vibration (or vibration force) transferred from the vibration apparatus 500 to the display member 100, or may increase a heat transfer rate of heat transferred from the vibration apparatus 500 to the display member 100. The heat transfer particle may include metal materials, metal nanoparticles, or metal nanowires, but aspects of the present disclosure are not limited thereto.

The connection member 400 according to an aspect of the present disclosure may have a thickness for reducing or preventing a physical contact between the vibration apparatus 500 and the display member 100. For example, the connection member 400 may be adjusted based on heat transfer efficiency (or thermal capacity) transferred from the vibration apparatus 500 to the display member 100. For example, the connection member 400 may be adjusted based on one or more of the thickness for reducing or preventing the physical contact between the vibration apparatus 500 and the display member 100 and a thickness for maximizing or increasing heat transfer efficiency (or thermal capacity) transferred from the vibration apparatus 500 to the display member 100, but aspects of the present disclosure are not limited thereto.

The display apparatus according to an aspect of the present disclosure may further include an air gap AG between the display member 100 and the vibration generating part 510.

The air gap AG may be configured between the display member 100 and the vibration apparatus 500 (or the vibration transfer part 530). For example, the air gap AG may be disposed (or provided) by a partial connection (or a partial coupling) between the display member 100 and the vibration apparatus 500 (or the vibration transfer part 530). For example, the vibration apparatus 500 or the vibration transfer part 530 may be disposed at the rear surface 100a of the display member 100 with the air gap AG therebetween. The air gap AG may allow the vibration apparatus 500 and the display member 100 to independently vibrate without depending on each other. Moreover, the air gap AG may enable a smooth vibration of the vibration apparatus 500 in vibration of the vibration apparatus 500 and a free strain of the display member 100 based thereon, and thus, may increase a vibration width of the display member 100, thereby increasing an intensity of an ultrasonic USW generated based on a vibration of the display member 100.

Figure 4:
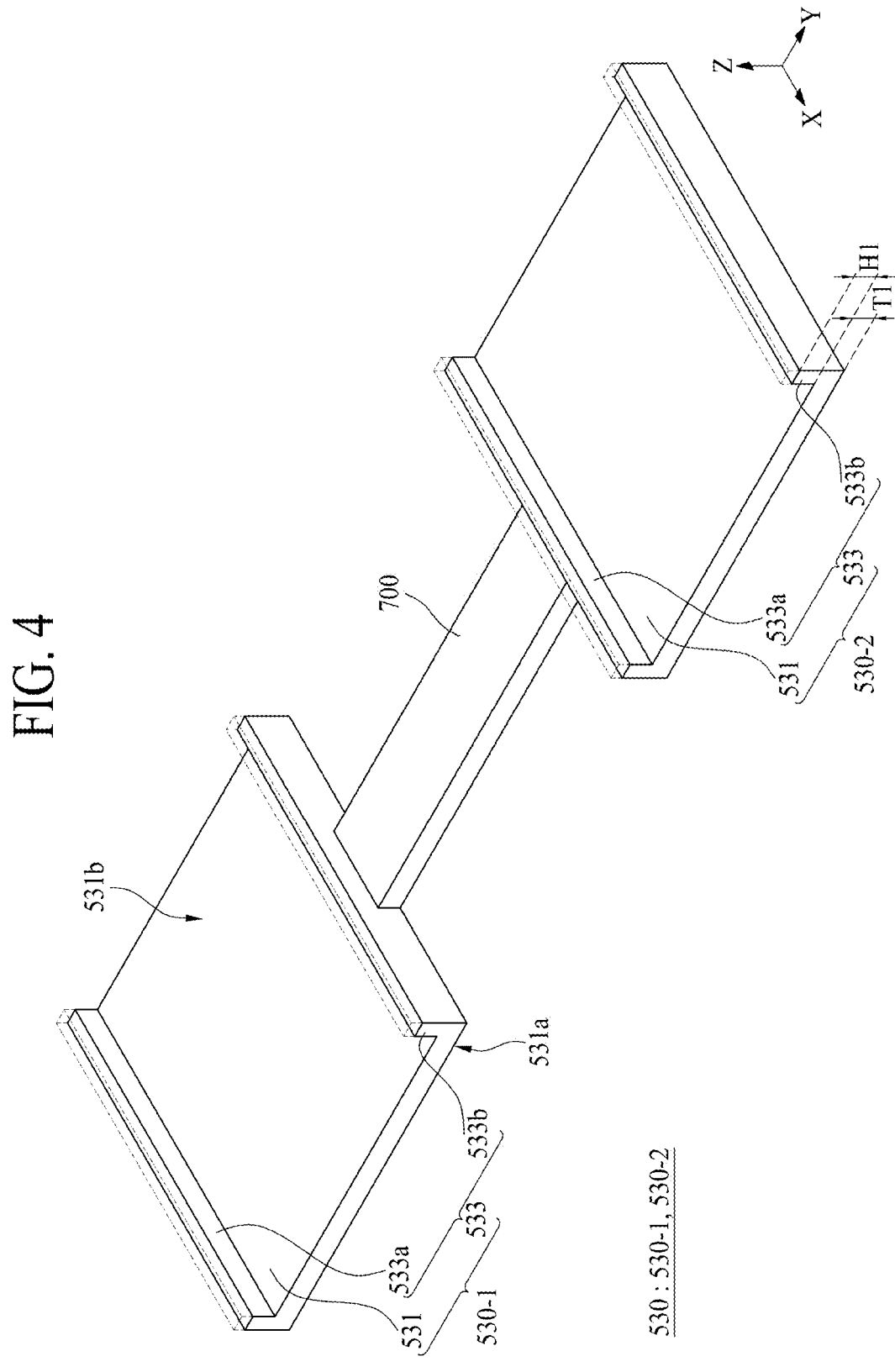
FIG. 4 is a perspective view illustrating a vibration transfer part according to an aspect of the present disclosure illustrated in FIG. 2.

FIG. 4 is a perspective view illustrating a vibration transfer part according to an aspect of the present disclosure illustrated in FIG. 2.

Referring to FIGS. 2 and 4, each of the plurality of vibration transfer part 530 according to an aspect (or a first aspect) of the present disclosure may include a base member 531 and a vibration transfer member 533.

The base member 531 may be configured to vibrate based on vibrations (or displacement or driving) of a one or more vibration generating parts 510. The base member 531 may be configured to support one or more vibration generating parts 510. The base member 531 may have a size which is equal to the vibration generating part 510 or is greater than the one or more vibration generating parts 510. The base member 531 may have a same shape as the vibration generating part 510, but aspects of the present disclosure are not limited thereto.

The base member 531 may be adhered or connected to a first surface (e.g., front surface) of the one or more vibration generating parts 510. For example, a first surface (e.g., rear surface) 531a of the base member 531 may be adhered or connected to the first surface (e.g., front surface) of the one or more vibration generating parts 510 by an adhesive member 560. Therefore, the base member 531 may vibrate based on vibrations of the one or more vibration generating parts 510. For example, the first surface (e.g., rear surface) 531a of the base member 531 may be a first surface (e.g., rear surface) of the vibration transfer part 530. For example, the base member 531 may be a plate, a base plate, a vibration plate, a vibration transfer plate, a base frame, a body, or a base structure, but aspects of the present disclosure are not limited thereto. For example, the base member 531 may include any one of a polygon, square, rectangle, diamond, and circle shape, but aspects of the present disclosure are not limited thereto. For example, a thickness T1 of the base member 531 according to an aspect of the present disclosure may be 0.01 mm or more and 5 mm or less, but aspects of the present disclosure are not limited thereto. For example, the first thickness T1 of the base member 531 may be 0.01 mm or more, based on a resonance frequency of the display member 100 and/or a frequency of an ultrasonic USW generated based on a vibration of the display member 100. For example, the resonance frequency of the display member 100 and/or the frequency of an ultrasonic USW generated based on a vibration of the display member 100 may be changed or tuned based on a size (or area) of the one or more vibration generating parts 510 and a size (or area) and a thickness T1 of the base member 531. For example, the size (or area) and/or the thickness T1 of the base member 1531 may be changed or optimized so that a frequency of the ultrasonic USW generated based on a vibration of the display member 100 corresponds to (or matches) the resonance frequency of the display member 100.

The vibration transfer member 533 may be configured to transfer a vibration of the base member 531 to the display member 100. The vibration transfer member 533 may be configured between the base member 531 and the display member 100. The vibration transfer member 533 may be connected to the base member 531. The vibration transfer member 533 may be disposed at or connected to a second surface (e.g., front surface) 531b of the base member 531 facing the display member 100. For example, the vibration transfer member 533 may be disposed at or connected to both periphery portions or both end portions of the base member 531. The vibration transfer member 533 may be connected or coupled to a rear surface 100a of the display member 100. For example, the vibration transfer member 533 may be connected or coupled to the rear surface 100a of the display member 100 by a connection member 400. For example, the vibration transfer member 533 may be a bridge, a leg, a rib, a protrusion portion, a bending portion, a bridge line, a rib line, a protrusion line, a vibration transfer structure, or a vibration transfer line, but aspects of the present disclosure are not limited thereto.

The vibration transfer member 533 may have a height (or thickness) for reducing or preventing a physical contact between the display member 100 and the base member 531. For example, the vibration transfer member 533 may be configured to have a height (or thickness) from the second surface 531b of the base member 531. For example, the height H1 of the vibration transfer member 533 may be a length (or distance) between the second surface 531b of the base member 531 and an uppermost surface of the vibration transfer member 533, in a third direction Z. For example, the height H1 of the vibration transfer member 533 may be a same as or different from the thickness T1 of the base member 531. For example, the height H1 of the vibration transfer member 533 may be set to 0.1 mm or more, but aspects of the present disclosure are not limited thereto. For example, the height H1 of the vibration transfer member 533 may be adjusted to 0.1 mm or more, based on a total thickness of an apparatus and the stiffness and size of the base member 531. For example, the third direction Z may be a thickness direction of the base member 531 or the display member 100 or a Z-axis direction in an XYZ coordinate system.

The vibration transfer member 533 according to an aspect of the present disclosure may include a first vibration transfer member 533a and a second vibration transfer member 533b. For example, the vibration transfer member 533 may include the first vibration transfer member 533a and the second vibration transfer member 533b, which are disposed at or connected to both periphery portions or both end portions of the base member 531. For example, the vibration transfer member 533 may include the first vibration transfer member 533a and the second vibration transfer member 533b, which protrude from the both periphery portions or the both end portions of the base member 531. The base member 531 and the first and second vibration transfer members 533a and 533b may include a plastic material or a metal material described above, but aspects of the present disclosure are not limited thereto.

According to an aspect of the present disclosure, the first vibration transfer member 533a may be configured at a first lateral periphery portion of the base member 531. For example, the first vibration transfer member 533a may be disposed at or connected to a first periphery portion or a first lateral end portion of the base member 531. For example, the first vibration transfer member 533a may be configured or connected to the first periphery portion or the first lateral end portion adjacent to a first side of the base member 531. For example, the first vibration transfer member 533a may be bent (or protruded) toward the rear surface 100a of the display member 100 from the first periphery portion or the first lateral end portion of the base member 531. For example, the first vibration transfer member 533a may be configured to have the first height (or thickness).

According to an aspect of the present disclosure, the second vibration transfer member 533b may be configured at a second lateral periphery portion of the base member 531 in parallel to the first vibration transfer member 533a. For example, the second vibration transfer member 533b may be disposed at or connected to a second periphery portion or a second lateral end portion of the base member 531. For example, the second vibration transfer member 533b may be disposed or connected to the second periphery portion or the second lateral end portion adjacent to a second side in parallel with the first side of the base member 531. For example, the second vibration transfer member 533b may be bent (or protruded) toward the rear surface 100a of the display member 100 from the second periphery portion or the second lateral end portion of the base member 531. For example, the second vibration transfer member 533b may be configured to have the first height (or thickness).

Each of the first vibration transfer member 533a and the second vibration transfer member 533b may include a line shape having a certain width. For example, each of the first vibration transfer member 533a and the second vibration transfer member 533b may extend along a first direction X and may include the line shape having a predetermined width in parallel to a second direction Y intersecting with the first direction X. For example, the first direction X may be a horizontal length direction or a lateral length direction of the base member 531 or the display member 100 or an X-axis direction of an XYZ coordinate system. For example, the second direction Y may be a vertical length direction or a longitudinal length direction of the base member 531 or the display member 100 or a Y-axis direction of the XYZ coordinate system.

According to an aspect of the present disclosure, each of the first vibration transfer member 533a and the second vibration transfer member 533b may be vertically disposed at or connected to the second surface 531b of the base member 531. For example, an angle between the second surface 531b of the base member 531 and each of the first vibration transfer member 533a and the second vibration transfer member 533b may be 90 degrees.

Referring to FIGS. 2 and 4, each of the first vibration transfer member 533a and the second vibration transfer member 533b may be connected or coupled to the rear surface 100a of the display member 100 by a connection member 400. The first vibration transfer member 533a and the second vibration transfer member 533b may dispose an air gap AG between the rear surface 100a of the display member 100 and the base member 531. For example, the air gap AG may be disposed (or provided) between the rear surface 100a of the display member 100 and the base member 531 by the first vibration transfer member 533a and the second vibration transfer member 533b. Therefore, the first vibration transfer member 533a and the second vibration transfer member 533b may be disposed at or connected to the second surface 531b of the base member 531 with the air gap AG therebetween in parallel. For example, each of the first vibration transfer member 533a and the second vibration transfer member 533b may overlap or not overlap the one or more vibration generating parts 510, based on a size of the base member 531 and/or the one or more vibration generating parts 510.

According to an aspect of the present disclosure, the vibration transfer member 533 of the vibration apparatus 500 may be connected or coupled to the display member 100 by a partial connection scheme based on the connection member 400, and thus, compared to an entire connection scheme between the vibration transfer part 530 and the display member 100 by the connection member 400, a connection process (or attachment process) and connection quality (or attachment performance) between the display member 100 and the vibration apparatus 500 may be improved.

According to an aspect of the present disclosure, the connection portion 700 may be configured between the plurality of vibration generating parts 530. The connection portion 700 may be configured between the first vibration generating apparatus 500-1 and the second vibration generating apparatus 500-2 adjacent to each other. The connection portion 700 may be connected between base members 531 adjacent to each other. The connection portion 700 may be connected between a base member 531 of the first vibration generating apparatus 500-1 and a base member 531 of the second vibration generating apparatus 500-2. For example, the connection portion 700 may be connected to a center region of the base member 531 of the first vibration generating apparatus 500-1 and a center region of the base member 531 of the second vibration generating apparatus 500-2. For example, the connection portion 700 may be connected to a second vibration transfer member 533b of the first vibration generating apparatus 500-1 and a first vibration transfer member 533a of the second vibration generating apparatus 500-2 adjacent to each other. For example, the connection portion 700 may protrude in a horizontal direction (or a Y direction) from the base member 531 of the first vibration generating apparatus 500-1. For example, the connection portion 700 may protrude in a horizontal direction (or a –Y direction) from the base member 531 of the second vibration generating apparatus 500-2.

According to an aspect of the present disclosure, a width or a horizontal-direction length of the connection portion 700 or a length of the connection portion 700 in an X-axis direction of an XYZ coordinate system may be less than a width or a horizontal-direction length of the base member 531 or a length of the base member 531 in the X-axis direction of the XYZ coordinate system. For example, a width of the base member 531 may be two or more times a width of the connection portion 700. For example, a width or a horizontal-direction length of the connection portion 700 and a length of the connection portion 700 in the X-axis direction of the XYZ coordinate system may be less than a length and a vertical-direction length of the connection portion 700 and a length of the base member 531 in a Y-axis direction of the XYZ coordinate system. For example, a width of the connection portion 700 may be less than a length of the connection portion 700. For example, a length of the connection portion 700 may be two or more times a width of the connection portion 700, but aspects of the present disclosure are not limited thereto. As another example, a length of the connection portion 700 may be set to two times or three or more times a width of the connection portion 700 and may be adjusted based on a vibration apparatus.

According to an aspect of the present disclosure, the vibration apparatus may include the connection portion 700 and may thus change a vibration (or longitudinal vibration or in-plane vibration) of each of the plurality of vibration generating parts 510 to a thickness-direction vibration (or traverse vibration or out-plane vibration) of the display member 100 to transfer to the display member 100, thereby increasing the efficiency of the squeeze film effect generated based on a vibration of the display member 100. Accordingly, the recognition of a user may be enhanced on an ultrasound vibration and/or an ultrasound haptic and/or a virtual texture.

Figure 5:
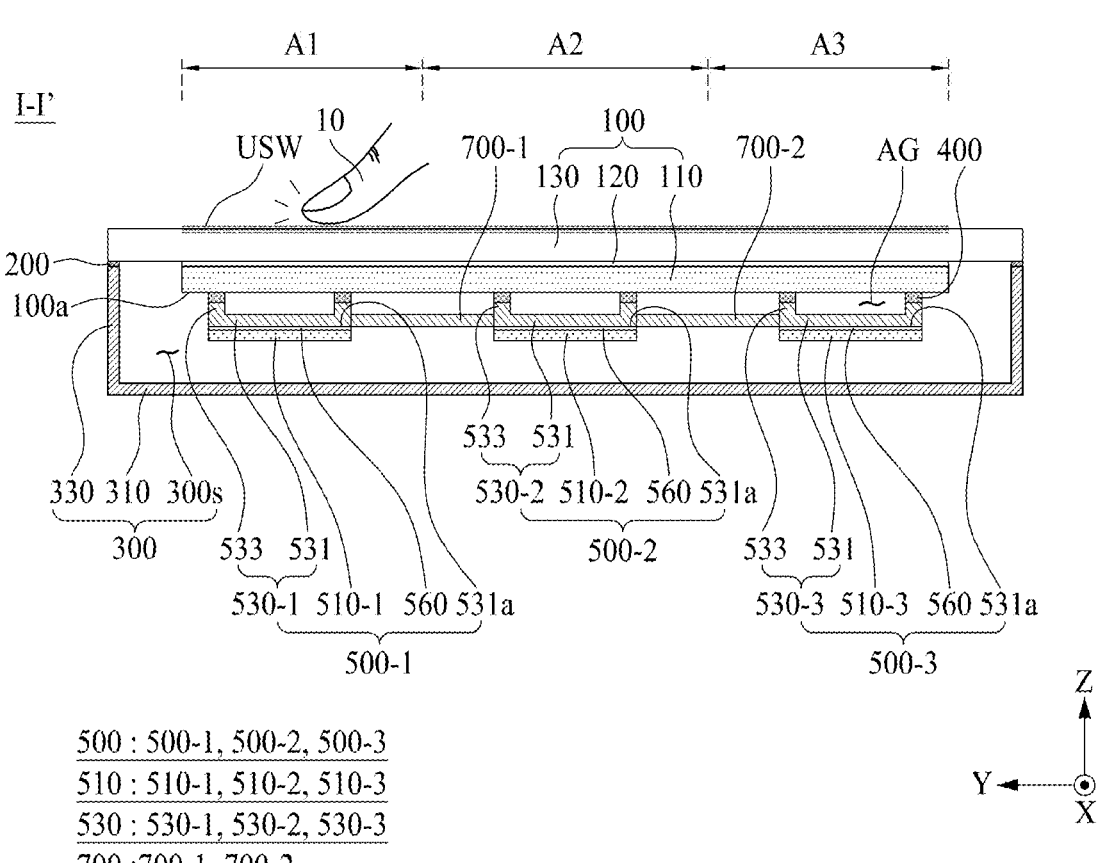
FIG. 5 is a diagram illustrating a display apparatus according to another aspect of the present disclosure.
Figure 6:
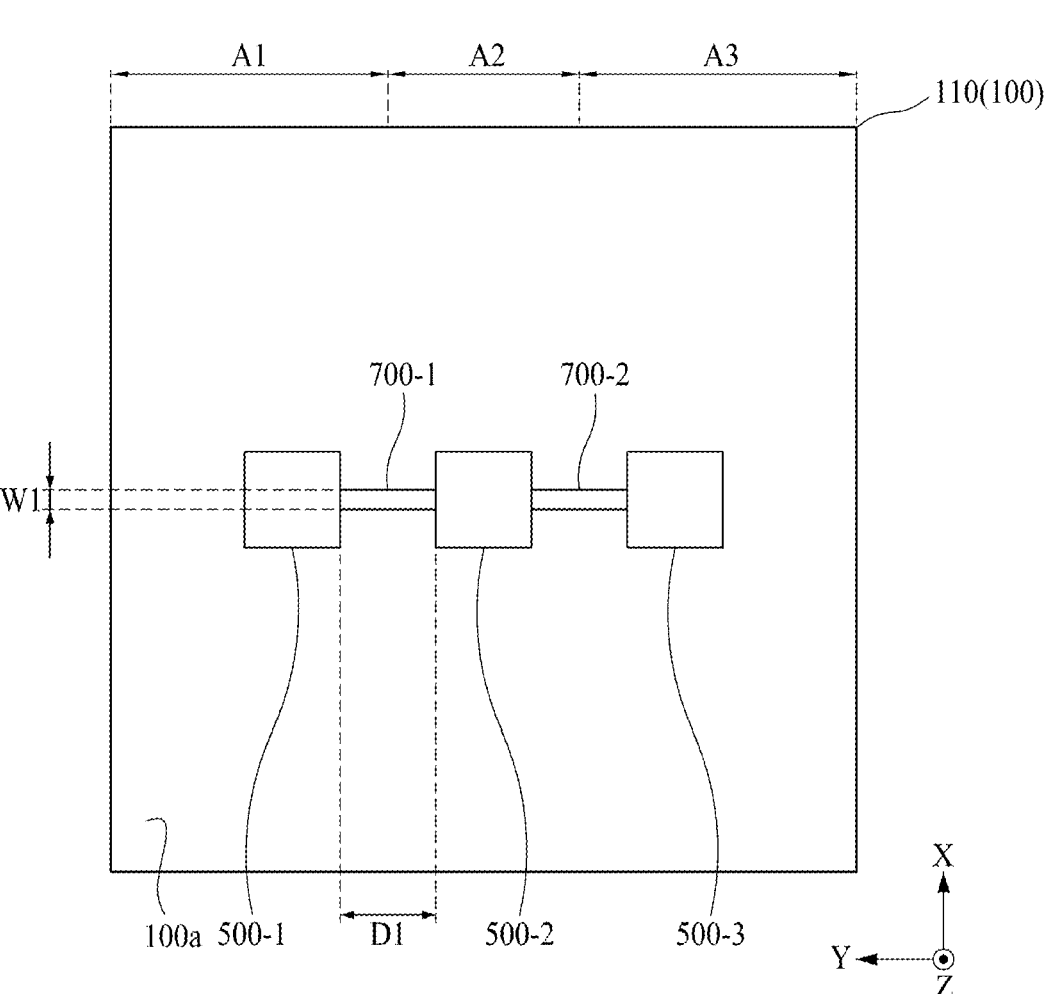
FIG. 6 is a rear view illustrating a plurality of vibration apparatuses and a display member illustrated in FIG. 1.

FIG. 5 is a diagram illustrating a display apparatus according to another aspect of the present disclosure. FIG. 6 is a rear view illustrating a plurality of vibration apparatuses and a display member illustrated in FIG. 1. FIGS. 5 and 6 illustrate an aspect implemented by modifying a vibration transfer part of the vibration apparatus described above with reference to FIGS. 1 to 4. Therefore, in the following description, a vibration transfer part and the other elements except elements relevant thereto are referred to by like reference numerals, and repeated descriptions are omitted.

Referring to FIGS. 1, 5, and 6, in a display apparatus according to another aspect of the present disclosure, a vibration apparatus 500 may include a plurality of vibration generating apparatuses 500-1 to 500-3. For example, the vibration apparatus 500 may include first to third vibration generating apparatuses 500-1 to 500-3. For example, the vibration apparatus 500 may include a plurality of ultrasound generating apparatuses 500-1 to 500-3 or first to third ultrasound generating apparatuses 500-1 to 500-3. For example, the display apparatus according to another aspect of the present disclosure may include one or more vibration apparatuses (or vibration generating apparatuses) 500 or one or more ultrasound generating apparatuses 500-1 to 500-3.

The first to third vibration generating apparatuses 500-1 to 500-3 may be configured to be connected to first to third regions (or rear regions) A1 to A3 of the display member 100.

In the display member 100, with respect to a second direction Y, the first region (or a first rear region) A1 may be an upper region or a top region of the display member 100. The second region (or a second rear region) A2 may be a center region or a middle region of the display member 100. The third region (or a third rear region) A3 may be a lower region or a bottom region of the display member 100. For example, the second region A2 may be between the first region A1 and the third region A3. The display member 100 may include a plurality of haptic regions (or ultrasound generating regions) which respectively correspond to or overlap the first to third regions A1 to A3.

The first vibration generating apparatus 500-1 and the second vibration generating apparatus 500-2 may be configured to be substantially equal to an aspect of the present disclosure described above with reference to FIGS. 1 to 4.

The third vibration generating apparatus 500-3 may be configured to generate (or output) an ultrasound vibration and/or an ultrasound haptic in the third region A3 of the display member 100. The third vibration generating apparatus 500-3 may vibrate based on the driving signal supplied from the driving circuit part to vibrate the third region A3 of the display member 100, and thus, may generate (or output) an ultrasound USW in the third region A3 of the display member 100.

The third vibration generating apparatus 500-3 may be connected to or supported by the rear surface 100a of the display member 100 by using the connection member 400. For example, the third vibration generating apparatus 500-3 may be connected to or supported by the rear surface 100a of the display panel 110 by using the connection member 400. For example, the plurality of vibration apparatuses or the first to third vibration generating apparatuses 500-1 to 500-3 may be configured in the same line. For example, the plurality of vibration apparatuses or the first to third vibration generating apparatuses 500-1 to 500-3 may be configured in the same line with respect to the second direction Y.

The third vibration generating apparatus 500-3 may include the same elements as those of one of the first vibration generating apparatus 500-1 and the second vibration generating apparatus 500-2 described above with reference to FIGS. 1 to 4, and thus, repeated descriptions are omitted.

According to another aspect of the present disclosure, each of the first to third vibration generating apparatuses 500-1 to 500-3 may be simultaneously driven or may be individually driven, but aspects of the present disclosure are not limited thereto. For example, the plurality of vibration apparatuses or one or more of the first to third vibration generating apparatuses 500-1 to 500-3 may be simultaneously driven based on a touch region by a user. For example, the plurality of vibration apparatuses or two or more vibration generating apparatuses 500-1 to 500-3, which overlap the touch region by the user or are disposed at a periphery of the touch region, of the first to third vibration generating apparatuses 500-1 to 500-3 may be simultaneously driven. Accordingly, a uniform ultrasound vibration and/or ultrasound haptic may be generated in the touch region by the user and at a periphery thereof, and thus, a seamless haptic effect and/or virtual texture may be continuously provided to the user.

The display apparatus according to another aspect of the present disclosure may provide substantially the same effect as an aspect of the present disclosure. Also, the display apparatus according to another aspect of the present disclosure may provide a haptic effect and/or a virtual texture to the user in an entire region without a dead zone in a surface of the display member 100 by using the plurality of vibration generating apparatuses 500-1 to 500-3.

According to another aspect of the present disclosure, the connection portion 700 may include a first connection portion 700-1 and a second connection portion 700-2. The first connection portion 700-1 may be configured to be substantially equal to the connection portion 700 according to an aspect of the present disclosure described above with reference to FIG. 4. Therefore, repeated descriptions of the first connection portion 700-1 are omitted.

The second connection portion 700-2 may be configured between the second vibration generating apparatus 500-2 and the third vibration generating apparatus 500-3 adjacent to each other. The second connection portion 700-2 may be configured between the second vibration transfer part 530-2 and the third vibration transfer part 530-3 adjacent to each other. The second connection portion 700-2 may be connected between base members 531 adjacent to each other. The second connection portion 700-2 may be connected between a base member 531 of the second vibration transfer part 530-2 and a base member 531 of the third vibration transfer part 530-3. For example, the second connection portion 700-2 may be connected to a center region of the base member 531 of the second vibration transfer part 530-2 and a center region of the base member 531 of the third vibration transfer part 530-3. However, aspects of the present disclosure are not limited thereto. For example, the second connection portion 700-2 may be configured between a second vibration transfer member 533*b* of the second vibration generating apparatus 500-2 and a first vibration transfer member 533*a* of the third vibration generating apparatus 500-3 adjacent to each other. For example, the second connection portion 700-2 may protrude in the horizontal direction (or the Y direction) from the base member 531 of the second vibration transfer part 530-2. For example, the second connection portion 700-2 may protrude in the horizontal direction (or the –Y direction) from the base member 531 of the third vibration transfer part 530-3. For example, a width of the second connection portion 700-2 may be less than a length of the second connection portion 700-2. For example, a length of the second connection portion 700-2 may be two or more times a width of the second connection portion 700-2, but aspects of the present disclosure are not limited thereto. As another example, a length of the second connection portion 700-2 may be set to two times or three or more times a width of the second connection portion 700-2 and may be adjusted based on a vibration apparatus.

The vibration apparatus according to an aspect of the present disclosure may include the first and second connection portions 700-1 and 700-2 configured between the plurality of vibration transfer parts 530-1 to 530-3 and may thus change a vibration (or longitudinal vibration or in-plane vibration) of the vibration generating part 510 to a thickness-direction vibration (or traverse vibration or out-plane vibration) of the display member 100 to transfer to the display member 100, thereby increasing the efficiency of the squeeze film effect generated based on a vibration of the display member 100. Accordingly, the recognition of a user may be enhanced on an ultrasound vibration and/or an ultrasound haptic and/or a virtual texture.

Figure 7:
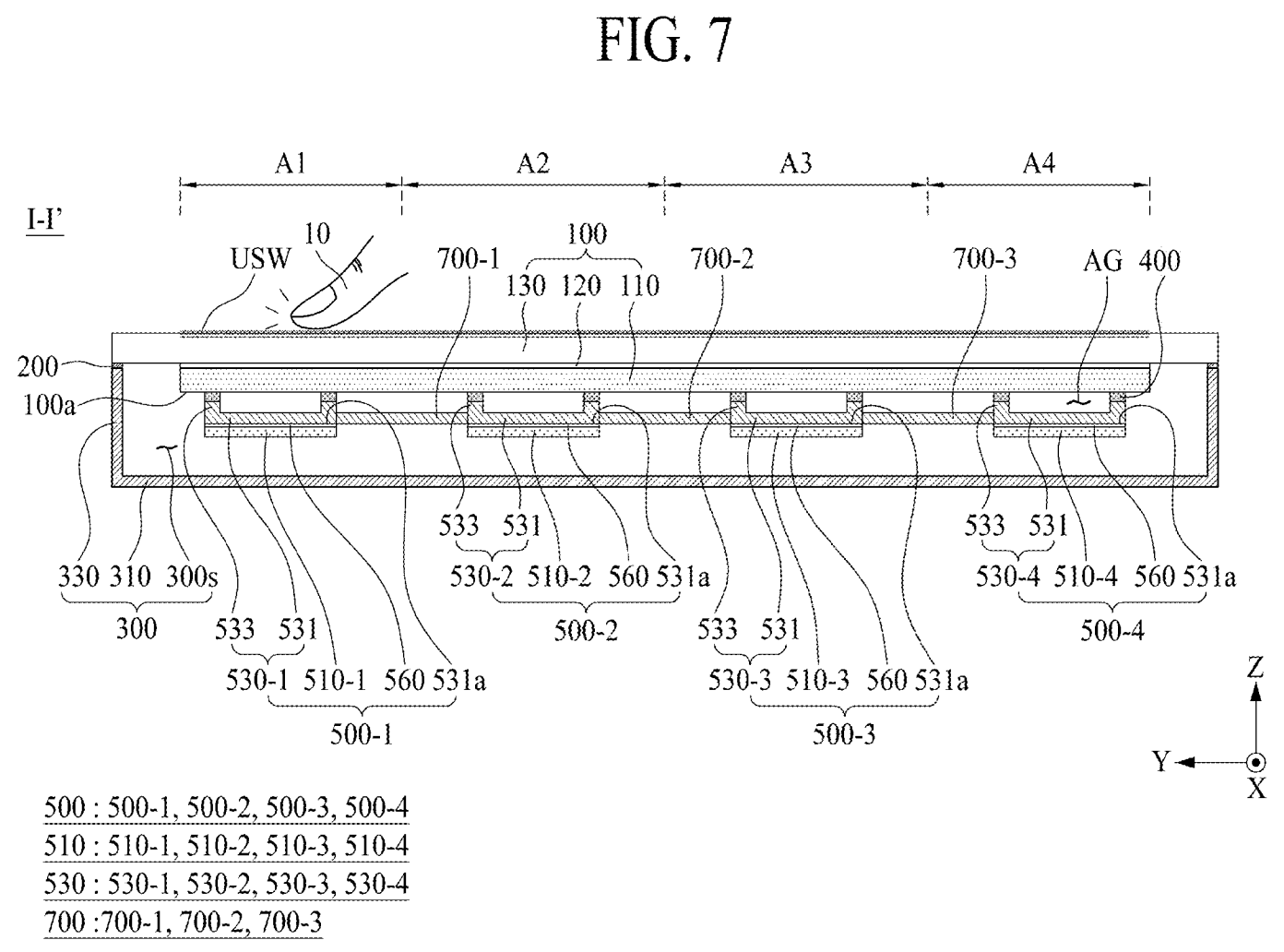
Figure 8:
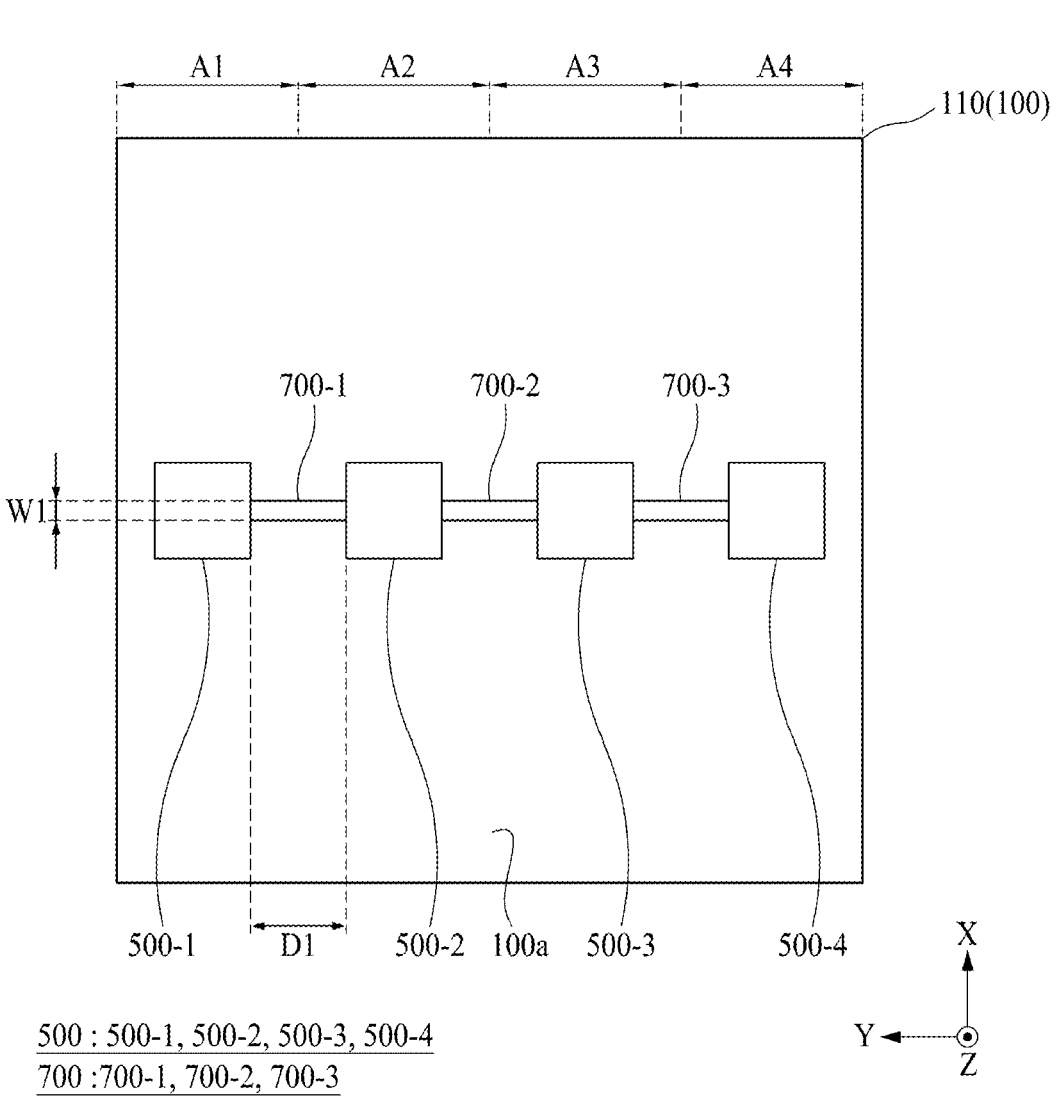
FIG. 8 is a rear view illustrating a plurality of vibration apparatuses and a display member illustrated in FIG. 7.

FIG. 7 is a diagram illustrating a display apparatus according to another aspect of the present disclosure. FIG. 8 is a rear view illustrating a plurality of vibration apparatuses and a display member illustrated in FIG. 7. FIGS. 7 and 8 illustrate an aspect implemented by modifying the vibration transfer part of the vibration apparatus described above with reference to FIGS. 1 to 4. FIGS. 7 and 8 illustrate an aspect where a configuration of a vibration transfer part is added to the vibration apparatus described above with reference to FIGS. 5 and 6. Therefore, in the following description, a vibration transfer part and the other elements except elements relevant thereto are referred to by like reference numerals, and repeated descriptions are omitted.

Referring to FIGS. 1, 5, 7, and 8, in a display apparatus according to another aspect of the present disclosure, a vibration apparatus 500 may include a plurality of vibration generating apparatuses 500-1 to 500-4. For example, the vibration apparatus 500 may further include a fourth vibration generating apparatus 500-4. For example, the vibration apparatus 500 may further include a fourth ultrasound generating apparatus 500-4.

The first to fourth vibration generating apparatuses 500-1 to 500-4 may be configured to be connected to first to fourth regions (or rear regions) A1 to A4 of the display member 100.

In the display member 100, with respect to a second direction Y, the first region (or a first rear region) A1 may be an upper region or a top region of the display member 100. Each of the second region (or a second rear region) A2 and the third region (or a third rear region) A3 may be a center region or a middle region of the display member 100. The fourth region (or a fourth rear region) A4 may be a lower region or a bottom region of the display member 100. For example, the second region A2 and the third region A3 may be between the first region A1 and the fourth region A4. The display member 100 may include a plurality of haptic regions (or ultrasound generating regions) which respectively correspond to or overlap the first to fourth regions A1 to A4.

The first to third vibration generating apparatuses 500-1 to 500-3 may be configured to be substantially equal to another aspect of the present disclosure described above with reference to FIGS. 5 and 6.

The fourth vibration generating apparatus 500-4 may be configured to generate (or output) an ultrasound vibration and/or an ultrasound haptic in the fourth region A4 of the display member 100. The fourth vibration generating apparatus 500-4 may vibrate based on the driving signal supplied from the driving circuit part to vibrate the fourth region A4 of the display member 100, and thus, may generate (or output) an ultrasound USW in the fourth region A4 of the display member 100.

The fourth vibration generating apparatus 500-4 may be connected to or supported by the rear surface 100*a* of the display member 100 by using the connection member 400. For example, the fourth vibration generating apparatus 500-4 may be connected to or supported by the rear surface 100*a* of the display panel 110 by using the connection member 400. For example, the plurality of vibration apparatuses or the first to fourth vibration generating apparatuses 500-1 to 500-4 may be configured in the same line. For example, the plurality of vibration apparatuses or the first to fourth vibration generating apparatuses 500-1 to 500-4 may be configured in the same line with respect to the second direction Y.

The fourth vibration generating apparatus 500-4 may include the same or substantially the same elements as those of one of the first to third vibration generating apparatuses 500-1 to 500-3 described above with reference to FIGS. 5 and 6, and thus, repeated descriptions are omitted.

According to another aspect of the present disclosure, each of the first to fourth vibration generating apparatuses 500-1 to 500-4 may be simultaneously driven or may be individually driven, but aspects of the present disclosure are not limited thereto. For example, the plurality of vibration apparatuses or one or more of the first to fourth vibration generating apparatuses 500-1 to 500-4 may be simultaneously driven based on a touch region by a user. For example, the plurality of vibration apparatuses or two or more vibration generating apparatuses 500-1 to 500-4, which overlap the touch region by the user or are disposed at a periphery of the touch region, of the first to fourth vibration generating apparatuses 500-1 to 500-4 may be simultaneously driven. Accordingly, a uniform ultrasound vibration and/or ultrasound haptic may be generated in the touch region by the user and at a periphery thereof, and thus, a seamless haptic effect and/or virtual texture may be continuously provided to the user.

The display apparatus according to another aspect of the present disclosure may provide substantially the same effect as an aspect of the present disclosure. Also, the display apparatus according to another aspect of the present disclosure may provide a haptic effect and/or a virtual texture to the user in an entire region without a dead zone in a surface of the display member 100 by using the plurality of vibration generating apparatuses 500-1 to 500-4.

According to another aspect of the present disclosure, the connection portion 700 may include a first connection portion 700-1, a second connection portion 700-2, and a third connection portion 700-3. The first connection portion 700-1 and the second connection portion 700-2 may be configured to be substantially equal to the connection portion 700 according to an aspect of the present disclosure described above with reference to FIG. 4. Therefore, repeated descriptions of the first connection portion 700-1 and the second connection portion 700-2 are omitted.

The third connection portion 700-3 may be configured between the third vibration generating apparatus 500-3 and the fourth vibration generating apparatus 500-4 adjacent to each other. The third connection portion 700-3 may be configured between the third vibration transfer part 530-3 and the fourth vibration transfer part 530-4 adjacent to each other. The third connection portion 700-3 may be connected between base members 531 adjacent to each other. The third connection portion 700-3 may be connected between a base member 531 of the third vibration transfer part 530-3 and a base member 531 of the fourth vibration transfer part 530-4. For example, the third connection portion 700-3 may be connected to a center region of the base member 531 of the third vibration transfer part 530-3 and a center region of the base member 531 of the fourth vibration transfer part 530-4. For example, the third connection portion 700-3 may be configured between a second vibration transfer member 533b of the third vibration generating apparatus 500-3 and a first vibration transfer member 533a of the fourth vibration generating apparatus 500-4 adjacent to each other. For example, the third connection portion 700-3 may protrude in the horizontal direction (or the Y direction) from the base member 531 of the third vibration transfer part 530-3. For example, the third connection portion 700-3 may protrude in the horizontal direction (or the −Y direction) from the base member 531 of the fourth vibration transfer part 530-4. For example, a width of the third connection portion 700-3 may be less than a length of the third connection portion 700-3. For example, a length of the third connection portion 700-3 may be two or more times a width of the third connection portion 700-3, but aspects of the present disclosure are not limited thereto. As another example, a length of the third connection portion 700-3 may be set to two times or three or more times a width of the third connection portion 700-3 and may be adjusted based on a vibration apparatus.

The vibration apparatus according to an aspect of the present disclosure may include the first to third connection portions 700-1 to 700-3 configured between the plurality of vibration transfer parts 530-1 to 530-4 and may thus change a vibration (or longitudinal vibration or in-plane vibration) of the vibration generating part 510 to a thickness-direction vibration (or traverse vibration or out-plane vibration) of the display member 100 to transfer to the display member 100, thereby increasing the efficiency of the squeeze film effect generated based on a vibration of the display member 100. Accordingly, the recognition of a user may be enhanced on an ultrasound vibration and/or an ultrasound haptic and/or a virtual texture.

Figure 9:
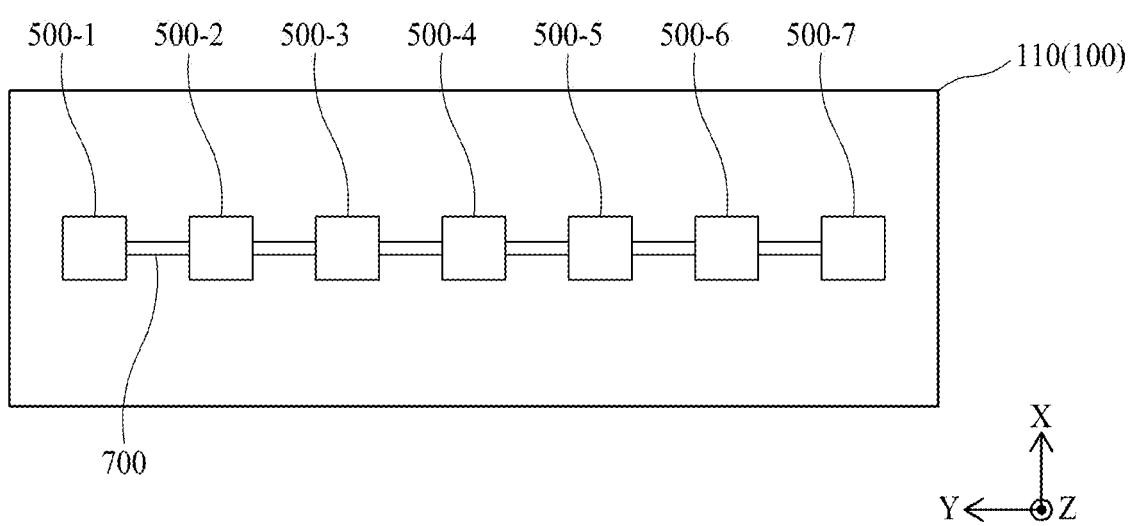
FIG. 9 is a rear view illustrating a plurality of vibration apparatuses and a display member according to another aspect of the present disclosure.

FIG. 9 is a rear view illustrating a plurality of vibration apparatuses and a display member according to another aspect of the present disclosure. FIG. 9 illustrates an aspect implemented by modifying the vibration transfer part of the vibration apparatus described above with reference to FIGS. 1 to 4. Therefore, in the following description, a vibration transfer part and the other elements except elements relevant thereto are referred to by like reference numerals, and repeated descriptions are omitted.

Referring to FIGS. 2 and 9, a display apparatus according to an aspect of the present disclosure may include a display member 100, a vibration generating apparatus 500, and a connection portion 700.

The display member 100 may be configured to display an image. The display member 100 and the connection portion 700 according to another aspect of the present disclosure may be the display member 100 and the connection portion 700 described above with reference to FIG. 2.

The vibration generating apparatus 500 may be configured to vibrate the display member 100. The vibration generating apparatus 500 may include a plurality of vibration generating apparatuses 500-1 to 500-7. For example, the vibration generating apparatus 500 may include first to seventh vibration generating apparatuses 500-1 to 500-7. Each of the first to seventh vibration generating apparatuses 500-1 to 500-7 may be substantially the same as one or more vibration generating apparatuses 500-1 to 500-4 of the vibration apparatuses 500 described above with reference to FIGS. 2 to 8.

According to another aspect of the present disclosure, a plurality of connection portions 700 may be configured between two adjacent vibration generating apparatuses of the plurality of vibration generating apparatuses 500-1 to 500-7. For example, the display apparatus according to another aspect of the present disclosure may implement a vibration of 98% or more in a vibration valid area of 0.2 μm. Accordingly, the display apparatus according to another aspect of the present disclosure may be applied to a large-area display apparatus.

Figure 10:
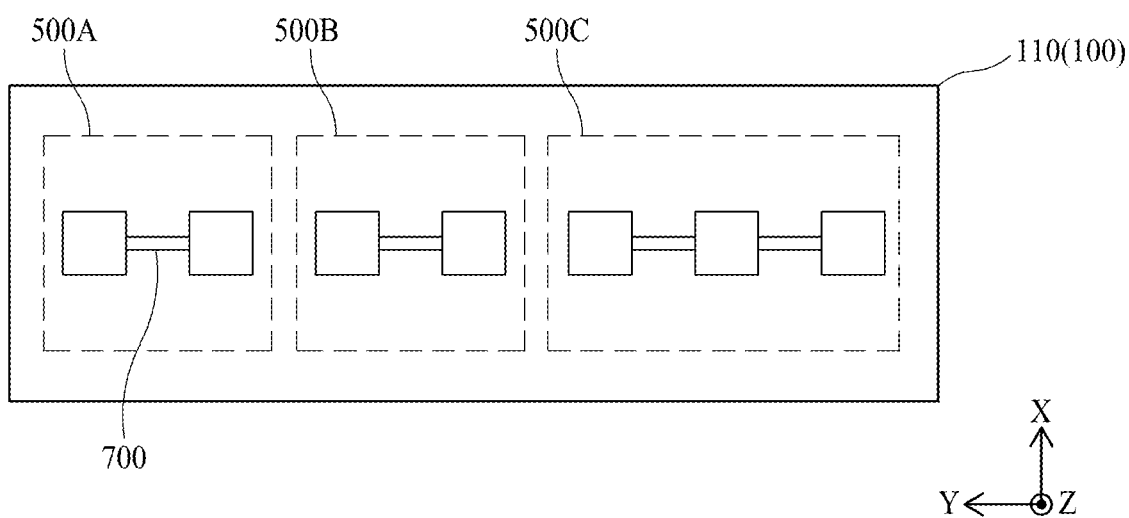
FIG. 10 is a rear view illustrating a plurality of vibration apparatuses and a display member according to another aspect of the present disclosure.

FIG. 10 is a rear view illustrating a plurality of vibration apparatuses and a display member according to another aspect of the present disclosure. FIG. 10 illustrates an aspect implemented by modifying the vibration transfer part of the vibration apparatus described above with reference to FIGS. 1 to 8. Therefore, in the following description, a vibration transfer part and the other elements except elements relevant thereto are referred to by like reference numerals, and repeated descriptions are omitted.

Referring to FIGS. 2, 5, and 10, a display apparatus according to an aspect of the present disclosure may include a display member 100, a vibration generating apparatus 500, and a connection portion 700.

The display member 100 may be configured to display an image. The display member 100 and the connection portion 700 according to another aspect of the present disclosure may be the display member 100 and the connection portion 700 described above with reference to FIG. 2.

The vibration generating apparatus 500 may be configured to vibrate the display member 100. The vibration generating apparatus 500 may include a plurality of vibration apparatuses 500A to 500C. For example, the vibration generating apparatus 500 may include first to third vibration apparatuses 500A to 500C. For example, the first and second vibration apparatuses 500A and 500B may have substantially the same configuration as that of the vibration apparatus 500 described above with reference to FIGS. 2 to 4. For example, the third vibration apparatus 500C may have substantially the same configuration as that of the vibration apparatus 500 described above with reference to FIGS. 5 and 6. However, aspects of the present disclosure are not limited thereto.

According to another aspect of the present disclosure, the first and third vibration apparatuses 500A and 500C may have substantially the same configuration as that of the vibration apparatus 500 described above with reference to FIGS. 2 to 4, and the second vibration apparatus 500B may have substantially the same configuration as that of the vibration apparatus 500 described above with reference to FIGS. 5 and 6.

According to another aspect of the present disclosure, the first and third vibration apparatuses 500A and 500C may have substantially the same configuration as that of the vibration apparatus 500 described above with reference to FIGS. 5 and 6, and the second vibration apparatus 500B may have substantially the same configuration as that of the vibration apparatus 500 described above with reference to FIGS. 2 to 4.

Referring to FIGS. 2, 5, and 10, at least some of a plurality of vibration apparatuses 500A to 500C may include a different number of vibration transfer parts 530 and vibration generating parts 510. For example, at least some of first to third vibration apparatuses 500A to 500C may include a different number of vibration transfer parts 530 and vibration generating parts 510. For example, each of the first and second vibration apparatuses 500A and 500B may include two vibration transfer parts 530 and two vibration generating parts 510. For example, the third vibration apparatus 500C may include three vibration transfer parts 530 and three vibration generating parts 510.

At least some of the plurality of vibration apparatuses 500A to 500C may include a different number of connection portions 700. For example, at least some of the first to third vibration apparatuses 500A to 500C may include a different number of connection portions 700. For example, each of the first and second vibration apparatuses 500A and 500B may include one connection portion 700. For example, the third vibration apparatus 500C may include two connection portions 700. For example, the connection portion 700 may not be configured between the plurality of vibration apparatuses 500A to 500C. For example, the connection portion 700 may not be configured between the first to third vibration apparatuses 500A to 500C. For example, the display apparatus according to another aspect of the present disclosure may implement a vibration of 99% or more in a vibration valid area of 0.2 µm. Accordingly, the display apparatus according to another aspect of the present disclosure may be applied to a large-area display apparatus.

Figure 11:
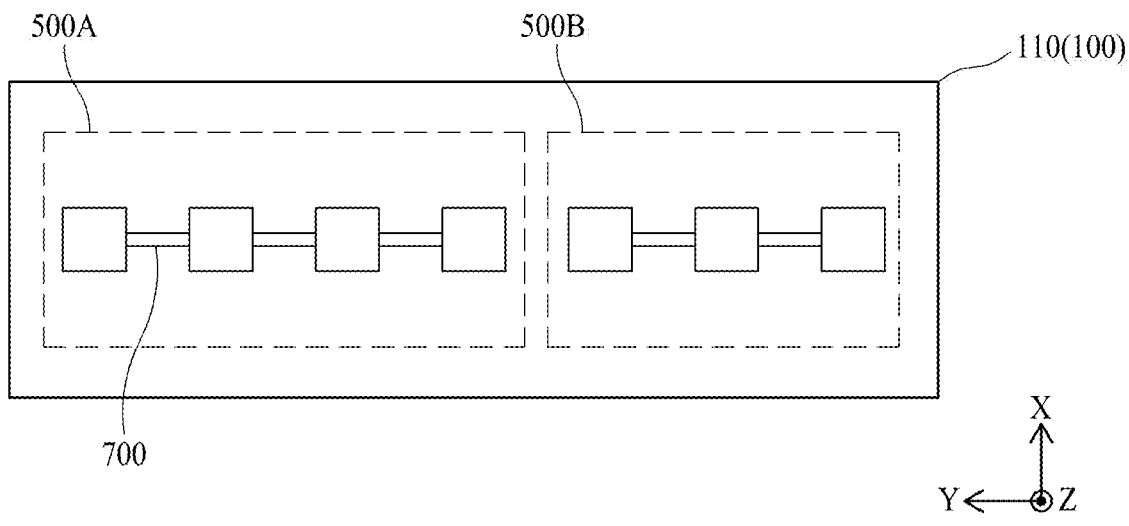
FIG. 11 is a rear view illustrating a plurality of vibration apparatuses and a display member according to another aspect of the present disclosure.

FIG. 11 is a rear view illustrating a plurality of vibration apparatuses and a display member according to another aspect of the present disclosure. FIG. 11 illustrates an aspect implemented by modifying the vibration transfer part of the vibration apparatus described above with reference to FIGS. 1 to 8. Therefore, in the following description, a vibration transfer part and the other elements except elements relevant thereto are referred to by like reference numerals, and repeated descriptions are omitted.

Referring to FIGS. 5, 7, and 11, a display apparatus according to an aspect of the present disclosure may include a display member 100, a vibration generating apparatus 500, and a connection portion 700.

The display member 100 may be configured to display an image. The display member 100 and the connection portion 700 according to another aspect of the present disclosure may be the display member 100 and the connection portion 700 described above with reference to FIG. 2.

The vibration generating apparatus 500 may be configured to vibrate the display member 100. The vibration generating apparatus 500 may include a plurality of vibration apparatuses 500A and 500B. For example, the vibration generating apparatus 500 may include first and second vibration apparatuses 500A and 500B. Each of the first and second vibration apparatuses 500A and 500B may be one vibration apparatus 500 of the vibration apparatuses 500 described above with reference to FIGS. 2 to 8. For example, the first vibration apparatus 500A may have substantially the same configuration as that of the vibration apparatus 500 described above with reference to FIGS. 7 and 8, and the second vibration apparatus 500B may have substantially the same configuration as that of the vibration apparatus 500 described above with reference to FIGS. 5 and 6. However, aspects of the present disclosure are not limited thereto. According to another aspect of the present disclosure, the first vibration apparatus 500A may have substantially the same configuration as that of the vibration apparatus 500 described above with reference to FIGS. 5 and 6, and the second vibration apparatus 500B may have substantially the same configuration as that of the vibration apparatus 500 described above with reference to FIGS. 7 and 8.

Referring to FIGS. 5, 7, and 11, a plurality of vibration apparatuses 500A and 500B may include a different number of vibration transfer parts 530 and vibration generating parts 510. For example, first and second vibration apparatuses 500A and 500B may include a different number of vibration transfer parts 530 and vibration generating parts 510. For example, the first vibration apparatuses 500A may include four vibration transfer parts 530 and four vibration generating parts 510. For example, the second vibration apparatus 500B may include three vibration transfer parts 530 and three vibration generating parts 510.

The plurality of vibration apparatuses 500A and 500B may include a different number of connection portions 700. For example, the first and second vibration apparatuses 500A and 500B may include a different number of connection portions 700. For example, the first vibration apparatus 500A may include three connection portions 700. For example, the second vibration apparatus 500B may include two connection portions 700. For example, the connection portion 700 may not be configured between the plurality of vibration apparatuses 500A and 500B. For example, the connection portion 700 may not be configured between the first and second vibration apparatuses 500A and 500B. For example, the display apparatus according to another aspect of the present disclosure may implement a vibration of 98% or more in a vibration valid area of 0.2 µm. Accordingly, the display apparatus according to another aspect of the present disclosure may be applied to a large-area display apparatus.

Figure 12:
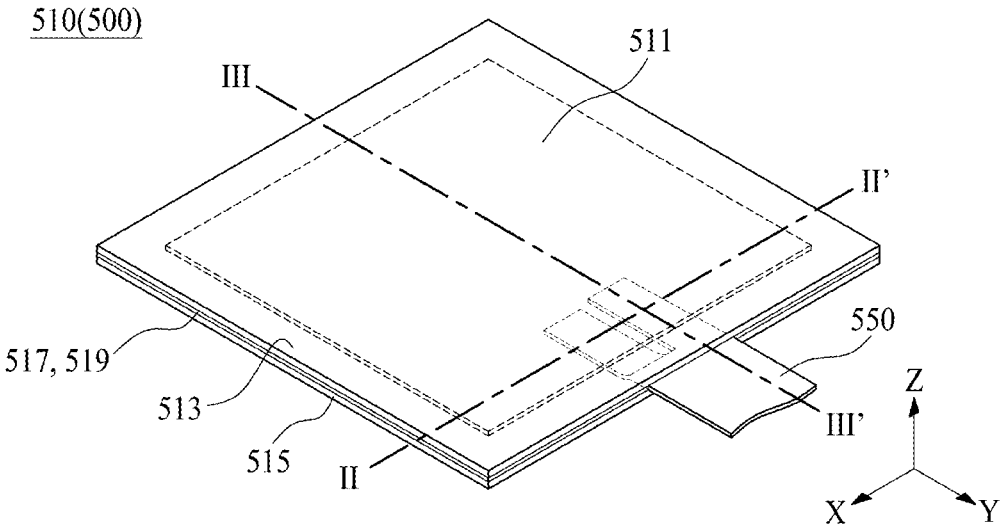
FIG. 12 is a diagram illustrating a vibration generating part according to an aspect of the present disclosure.
Figure 13:
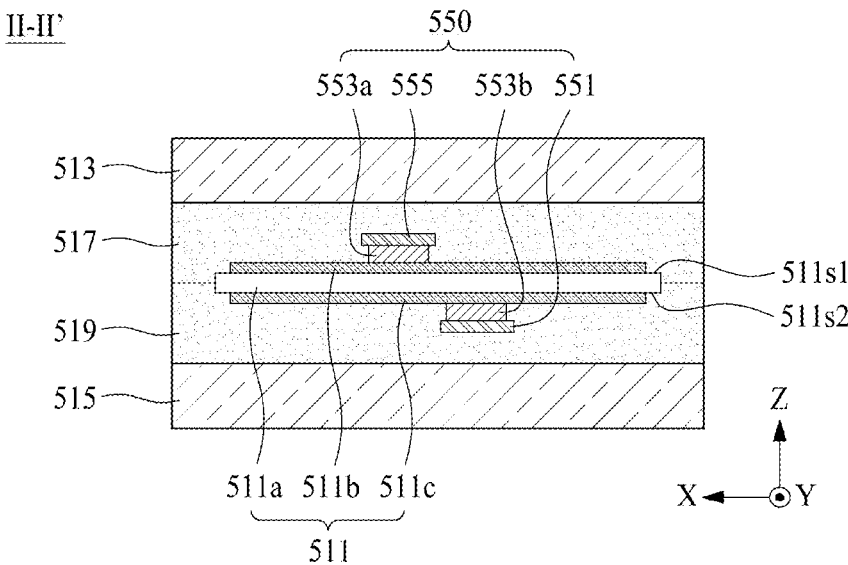
FIG. 13 is a cross-sectional view taken along line II-II' illustrated in FIG. 12 according to an aspect of the present disclosure.
Figure 14:
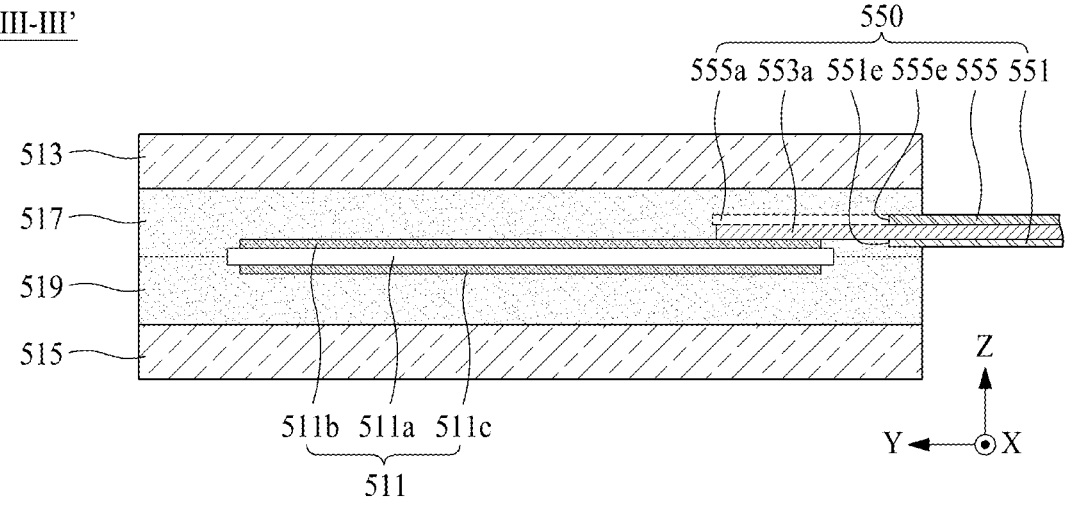
FIG. 14 is a cross-sectional view taken along line III-III' illustrated in FIG. 12 according to an aspect of the present disclosure.

FIG. 12 is a diagram illustrating a vibration generating part according to an aspect of the present disclosure. FIG. 13 is a cross-sectional view taken along line II-II' illustrated in FIG. 12 according to an aspect of the present disclosure. FIG. 14 is a cross-sectional view taken along line III-III' illustrated in FIG. 12 according to an aspect of the present disclosure. FIGS. 12 to 14 illustrate the vibration generating part of the vibration apparatus described above with reference to FIGS. 1 to 11.

Referring to FIGS. 12 to 14, the vibration generating part 510 the vibration apparatus 500 according to an aspect of the present disclosure may include a vibration part 511.

The vibration part 511 may be configured to vibrate by a piezoelectric effect based on a driving signal. The vibration part 511 may include at least one or more of a piezoelectric inorganic material and a piezoelectric organic material. For example, the vibration part 511 may be a piezoelectric device, a piezoelectric device part, a piezoelectric device layer, a piezoelectric structure, a piezoelectric vibration part, or a piezoelectric vibration layer, or the like, but aspects of the present disclosure are not limited thereto.

The vibration part 511 according to an aspect of the present disclosure may include a vibration layer 511a, a first electrode layer 511b, and a second electrode layer 511c.

The vibration layer 511a may include a piezoelectric material or an electroactive material which generates a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 511a may be a piezoelectric layer, a piezoelectric material layer, an electroactive layer, a piezoelectric composite layer, a piezoelectric composite, or a piezoelectric ceramic composite, or the like, but aspects of the present disclosure are not limited thereto.

The vibration layer 511a may be configured as a ceramic-based material for implementing a relatively strong vibration, or may be configured as a piezoelectric ceramic having a perovskite-based crystalline structure. The perovskite crystalline structure may have a piezoelectric effect and/or an inverse piezoelectric effect and may be a plate-shaped structure having an orientation.

The piezoelectric ceramic may be configured as a single crystalline ceramic having a crystalline structure, or may be configured as a ceramic material having a polycrystalline structure or polycrystalline ceramic. A piezoelectric material of the single crystalline ceramic may include $\alpha$-AlPO$_4$, $\alpha$-SiO$_2$, LiNbO$_3$, Tb$_2$(MoO$_4$)$_3$, Li$_2$B$_4$O$_7$, or ZnO, but aspects of the present disclosure are not limited thereto. A piezoelectric material of the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but aspects of the present disclosure are not limited thereto. For example, the vibration layer 511a may include at least one or more of calcium titanate (CaTiO$_3$), barium titanate (BaTiO$_3$), and strontium titanate (SrTiO$_3$) without lead (Pb), but aspects of the present disclosure are not limited thereto.

The first electrode layer 511b may be disposed at a first surface (or an upper surface or a front surface) 511s1 of the vibration layer 511a. The first electrode layer 511b may have a same size as the vibration layer 511a, or may have a size which is smaller than the vibration layer 511a.

The second electrode layer 511c may be disposed at a second surface (or a lower surface or a rear surface) 511s2 which is opposite to or different from the first surface 511s1 of the vibration layer 511a. The second electrode layer 511c may have a same size as the vibration layer 511a, or may have a size which is smaller than the vibration layer 511a. For example, the second electrode layer 511c may have a same shape as the vibration layer 511a, but aspects of the present disclosure are not limited thereto.

According to an aspect of the present disclosure, to prevent electrical short circuit between the first electrode layer 511b and the second electrode layer 511c, each of the first electrode layer 511b and the second electrode layer 511c may be formed at the other portion, except a periphery portion, of the vibration layer 511a. For example, the first electrode layer 511b may be formed at an entire first surface 511s1, other than a periphery portion, of the vibration layer 511a. For example, the second electrode layer 511c may be formed at an entire second surface 511s2, other than a periphery portion, of the vibration layer 511a. For example, a distance between a lateral surface (or a sidewall or a side surface) of each of the first electrode layer 511b and the second electrode layer 511c and a lateral surface (or a sidewall or a side surface) of the vibration layer 511a may be at least 0.5 mm or more. For example, the distance between the lateral surface of each of the first electrode layer 511b and the second electrode layer 511c and the lateral surface of the vibration layer 511a may be at least 1 mm or more, but aspects of the present disclosure are not limited thereto.

One or more of the first electrode layer 511b and the second electrode layer 511c according to an aspect of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or silver (Ag) including glass frit, or the like, or an alloy thereof, but aspects of the present disclosure are not limited thereto. For example, to enhance an electrical characteristic and/or a vibration characteristic of the vibration layer 511a, each of the first electrode layer 511b and the second electrode layer 511c may include silver (Ag) having a low resistivity. For example, carbon may be carbon black, ketjen black, carbon nanotube, and a carbon material including graphite, but aspects of the present disclosure are not limited thereto.

The vibration layer 511a may be polarized (or poling) by a certain voltage applied to the first electrode layer 511b and the second electrode layer 511c in a certain temperature atmosphere, or a temperature atmosphere that may be changed from a high temperature to a room temperature, but aspects of the present disclosure are not limited thereto. For example, a polarization direction (or a poling direction) formed in the vibration layer 511a may be formed or aligned (or arranged) from the first electrode layer 511b to the second electrode layer 511c, but is not limited thereto, and a polarization direction (or a poling direction) formed in the vibration layer 511a may be formed or aligned (or arranged) from the second electrode layer 511c to the first electrode layer 511b.

The vibration layer 511*a* may alternately and repeatedly contract and/or expand based on an inverse piezoelectric effect according to a driving signal applied to the first electrode layer 511*b* and the second electrode layer 511*c* from the outside to vibrate. For example, the vibration layer 511*a* may vibrate in a vertical direction (or thickness direction) and in a planar direction by the signal applied to the first electrode layer 511*b* and the second electrode layer 511*c*. The vibration layer 511*a* may be displaced (or vibrated or driven) by contraction and/or expansion of the planar direction, thereby improving a sound characteristic and/or a sound pressure level characteristic of vibration apparatus.

The vibration generating part 510 of the vibration apparatus 500 according to an aspect of the present disclosure may further include a first cover member 513 and a second cover member 515.

The first cover member 513 may be disposed at a first surface of the vibration part 511. For example, the first cover member 513 may be configured to cover the first electrode layer 511*b* of the vibration part 511. For example, the first cover member 513 may be configured to have a larger size than the vibration part 511. The first cover member 513 may be configured to protect the first surface of the vibration part 511 and the first electrode layer 511*b*.

The second cover member 515 may be disposed at a second surface of the vibration part 511. For example, the second cover member 515 may be configured to cover the second electrode layer 511*c* of the vibration part 511. For example, the second cover member 515 may be configured to have a larger size than the vibration part 511 and may be configured to have a same size as the first cover member 513. The second cover member 515 may be configured to protect the second surface of the vibration part 511 and the second electrode layer 511*c*.

Each of the first cover member 513 and the second cover member 515 according to an aspect of the present disclosure may include a same material or different material. For example, each of the first cover member 513 and the second cover member 515 may be a polyimide film, or a polyethylene terephthalate film, but aspects of the present disclosure are not limited thereto.

The first cover member 513 may be connected or coupled to the first surface of the vibration part 511 or the first electrode layer 511*b* by a first adhesive layer 517. For example, the first cover member 513 may be connected or coupled to the first surface of the vibration part 511 or the first electrode layer 511*b* by a film laminating process by the first adhesive layer 517.

The second cover member 515 may be connected or coupled to the second surface of the vibration part 511 or the second electrode layer 511*c* by a second adhesive layer 519. For example, the second cover member 515 may be connected or coupled to the second surface of the vibration part 511 or the second electrode layer 511*c* by a film laminating process by the second adhesive layer 519.

Each of the first adhesive layer 517 and second adhesive layer 519 according to an aspect of the present disclosure may include an electrically insulating material which has adhesiveness and is capable of compression and decompression. For example, each of the first adhesive layer 517 and the second adhesive layer 519 may include an epoxy resin, an acrylic resin, a silicone resin, or a urethane resin, but aspects of the present disclosure are not limited thereto.

The first adhesive layer 517 and second adhesive layer 519 may be configured between the first cover member 513 and the second cover member 515 to surround the vibration part 511. For example, one or more of the first adhesive layer

517 and second adhesive layer 519 may be configured to surround the vibration part 511.

Any one of the first cover member 513 and the second cover member 515, as illustrated in FIG. 12, may be connected to the vibration transfer part 530 by an adhesive member 560.

The vibration generating part 510 of the vibration apparatus 500 according to an aspect of the present disclosure may further include a signal supply member 550.

The signal supply member 550 may be configured to supply the driving signal supplied from a driving circuit part to the vibration generating part 510 or the vibration part 511. The signal supply member 550 may be configured to be electrically connected to the vibration part 511 at one side of the vibration apparatus 500 or the vibration generating part 510. The signal supply member 550 may be configured to be electrically connected to the first electrode layer 511*b* and the second electrode layer 511*c* of the vibration part 511.

A portion of the signal supply member 550 may be accommodated (or inserted) between the first cover member 513 and the second cover member 515. An end portion (or a distal end portion) of the signal supply member 550 may be disposed or inserted (or accommodated) between one periphery portion of the first cover member 513 and one periphery portion of the second cover member 515. The one periphery portion of the first cover member 513 and the one periphery portion of the second cover member 515 may accommodate or vertically cover the end portion (or the distal end portion or one side) of the signal supply member 550. Accordingly, the signal supply member 550 may be integrated into the vibration generating part 510. For example, the signal supply member 550 may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but aspects of the present disclosure are not limited thereto.

The signal supply member 550 according to an aspect of the present disclosure may include a base member 551 and a plurality of signal lines 553*a* and 553*b*. For example, the signal supply member 550 may include a base member 551, a first signal line 553*a*, and a second signal line 553*b*. For example, the base member 551 may be a cable base member, but aspects of the present disclosure are not limited thereto.

The base member 551 may include a transparent or opaque plastic material, but aspects of the present disclosure are not limited thereto. The base member 551 may have a certain width along a first direction X and may be extended long along a second direction Y intersecting with the first direction X.

The first and second signal lines 553*a* and 553*b* may be disposed at the first surface of the base member 551 in parallel with the second direction Y, and may be spaced apart from each other or electrically separated from each other in the first direction X. The first and second signal lines 553*a* and 553*b* may be disposed in parallel to each other at the first surface of the base member 551. For example, the first and second signal lines 553*a* and 553*b* may be implemented in a line shape by patterning of a metal layer (or a conductive layer) formed or deposited at the first surface of the base member 551.

End portions (or distal end portions or one sides or one portions) of the first and second signal lines 553*a* and 553*b* may be separated from each other, and thus, may be individually curved or bent.

The end portion (or a distal end portion or one side or one portion) of the first signal line 553a may be electrically connected to the first electrode layer 511b of the vibration part 511. For example, the end portion of the first signal line 553a may be electrically connected to at least a portion of the first electrode layer 511b of the vibration part 511 at one periphery portion of the first cover member 513. For example, the end portion (or the distal end portion or one side) of the first signal line 553a may be electrically and directly connected to the first electrode layer 511b of the vibration part 511. For example, the end portion (or the distal end portion or the one side or the one portion) of the first signal line 553a may be directly connected to or directly contact the first electrode layer 511b of the vibration part 511. For example, the end portion of the first signal line 553a may be electrically connected to the first electrode layer 511b by a conductive double-sided tape. Accordingly, the first signal line 553a may transfer a first driving signal, supplied from the driving circuit part, to the first electrode layer 511b of the vibration part 511.

The end portion (or a distal end portion or one side or one portion) of the second signal line 553b may be electrically connected to the second electrode layer 511c of the vibration part 511. For example, the end portion of the second signal line 553b may be electrically connected to at least a portion of the second electrode layer 511c of the vibration part 511 at one periphery portion of the second cover member 515. For example, the end portion of the second signal line 553b may be electrically and directly connected to at least a portion of the second electrode layer 511c of the vibration part 511. For example, the end portion of the second signal line 553b may be directly connected to or directly contact the second electrode layer 511c of the vibration part 511. For example, the end portion of the second signal line 553b may be electrically connected to the second electrode layer 511c by a conductive double-sided tape. Accordingly, the second signal line 553b may transfer a second driving signal, supplied from the driving circuit part, to the second electrode layer 511c of the vibration part 511.

The signal supply member 550 according to an aspect of the present disclosure may further include an insulation layer 555.

The insulation layer 555 may be disposed at the first surface of the base member 551 to cover each of the first signal line 553a and the second signal line 553b other than the end portion (or one side or one portion) of the signal supply member 550.

An end portion (or one side or one portion) of the signal supply member 550 including an end portion (or one side or one portion) of the base member 551 and an end portion (or one side or one portion) 555a of the insulation layer 555 may be inserted (or accommodated) between the first cover member 513 and the second cover member 515 and may be fixed between the first cover member 513 and the second cover member 515 by the first adhesive layer 517 and the second adhesive layer 519. Accordingly, the end portion (or the one side or one portion) of the first signal line 553a may be maintained with being electrically connected to the first electrode layer 511b of the vibration part 511, and the end portion (or the one side or one portion) of the second signal line 553b may be maintained with being electrically connected to the second electrode layer 511c of the vibration part 511. Furthermore, the end portion (or the one side or one portion) of the signal supply member 550 may be inserted (or accommodated) and fixed between the vibration part 511 and the first cover member 513, and thus, a contact defect (or bad connection) between the vibration generating part 510 and the signal supply member 550 caused by the movement of the signal supply member 550 may be prevented.

In the signal supply member 550 according to an aspect of the present disclosure, each of the end portion (or the one side or one portion) of the base member 551 and an end portion (or one side or one portion) 555a of the insulation layer 555 may be removed. For example, each of the end portion of the first signal line 553a and the end portion of the second signal line 553b may be exposed at the outside without being supported or covered by each of the end portion (or the one side or one portion) of the base member 551 and the end portion (or the one side or one portion) 555a of the insulation layer 555. For example, the end portion of each of the first and second signal lines 553a and 553b may protrude (or extend) to have a certain length from an end 551e of the base member 551 or an end 555e of the insulation layer 555. Accordingly, each of the end portions (or the distal end portion or the one side or the one portion) of the first and second signal lines 553a and 553b may be individually or independently curved (or bent).

The end portion (or the one side or the one portion) of the first signal line 553a, which is not supported by the end portion (or the one side or one portion) of the base member 551 and the end portion 555a of the insulation layer 555, may be directly connected to or directly contact the first electrode layer 511b of the vibration part 511. The end of the second signal line 553b, which is not supported by the end portion (or the one side or the one portion) of the base member 551 and the end portion (or the one side or the one portion) 555a of the insulation layer 555, may be directly connected to or directly contact the second electrode layer 511c of the vibration part 511.

According to an aspect of the present disclosure, a portion of the signal supply member 550 or a portion of the base member 551 may be disposed or inserted (or accommodated) between the first cover member 513 and the second cover member 515, and thus, the signal supply member 550 may be integrated into (or configured as one body with) the vibration generating part 510. Accordingly, the vibration generating part 510 and the signal supply member 550 may be configured as one part (or one component), and thus, an effect of uni-materialization may be obtained.

According to an aspect of the present disclosure, the first signal line 553a and the second signal line 553b of the signal supply member 550 may be integrated into (or configured as one body with) the vibration generating part 510, and thus, a soldering process for an electrical connection between the vibration generating part 510 and the signal supply member 550 may not be needed. Accordingly, a manufacturing process and a structure of the vibration generating part 510 may be simplified, and thus, a hazardous process may be reduced or prevented.

Figure 15:
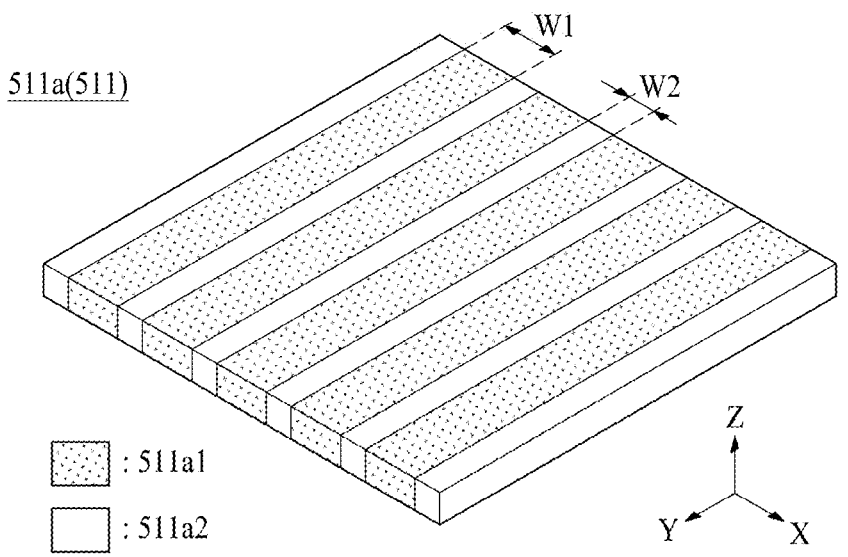
FIG. 15 is a diagram illustrating a vibration layer according to another aspect of the present disclosure.

FIG. 15 is a diagram illustrating a vibration layer according to another aspect of the present disclosure. FIG. 15 illustrates another aspect of the vibration layer according to another aspect of the present disclosure described above with reference to FIGS. 12 to 14.

Referring to FIGS. 13 and 15, the vibration layer 511a according to another aspect of the present disclosure may include a plurality of first portions 511a1 and a plurality of second portions 511a2. For example, the plurality of first portions 511a1 and the plurality of second portions 511a2 may be alternately and repeatedly disposed along a first direction X (or a second direction Y).

Each of the plurality of first portions 511a1 may include an inorganic material having a piezoelectric effect (or a piezoelectric characteristic). For example, each of the plurality of first portions 511*a*1 may include at least one or more of a piezoelectric inorganic material and a piezoelectric organic material. For example, each of the plurality of first portions 511*a*1 may be an inorganic portion, an inorganic material portion, a piezoelectric portion, a piezoelectric material portion, or an electroactive portion, but aspects of the present disclosure are not limited thereto.

According to an aspect of the present disclosure, each of the plurality of first portions 511*a*1 may have a first width W1 parallel to the first direction X (the second direction Y) and may be extended along the second direction Y (the first direction X) intersecting with the first direction X (the second direction Y). Each of the plurality of first portions 511*a*1 may include a material which is be substantially a same as the vibration layer 511*a* described above with reference to FIGS. 12 to 14, and thus, repeated descriptions thereof are omitted.

Each of the plurality of second portions 511*a*2 may be disposed between the plurality of first portions 511*a*1. For example, each of the plurality of first portions 511*a*1 may be disposed between two adjacent second portions 511*a*2 of the plurality of second portions 511*a*2. Each of the plurality of second portions 511*a*2 may have a second width W2 parallel to the first direction X (or the second direction Y) and may be extended along the second direction Y (or the first direction X). The first width W1 may be a same as or different from the second width W2. For example, the first width W1 may be greater than the second width W2. For example, the first portion 511*a*1 and the second portion 511*a*2 may include a line shape or a stripe shape which has a same size or different sizes, without being limited thereto.

Each of the plurality of second portions 511*a*2 may be configured to fill a gap between two adjacent first portions 511*a*1 of the plurality of first portions 511*a*1. Each of the plurality of second portions 511*a*2 may be configured to fill a gap between two adjacent first portions 511*a*1 of the plurality of first portions 511*a*1, and thus, may be connected to or attached on lateral surfaces of the first portion 511*a*1 adjacent thereto. According to an aspect of the present disclosure, each of the plurality of first portions 511*a*1 and the plurality of second portions 511*a*2 may be disposed (or arranged) at a same plane (or a same layer) in parallel with each other. Therefore, the vibration layer 511*a* may be expanded to a desired size or length by a lateral coupling (or connection) of the first portion 511*a*1 and the second portion 511*a*2.

According to an aspect of the present disclosure, each of the plurality of second portions 511*a*2 may absorb an impact applied to the first portions 511*a*1, and thus, may enhance the durability of the first portions 511*a*1 and provide flexibility to the vibration layer 511*a*. Each of the plurality of second portions 511*a*2 may include an organic material having a ductile characteristic. For example, each of the plurality of second portions 511*a*2 may include one or more of an epoxy-based polymer, an acrylic-based polymer, and a silicone-based polymer, but aspects of the present disclosure are not limited thereto. For example, each of the plurality of second portions 511*a*2 may be an organic portion, an organic material portion, an adhesive portion, a stretch portion, a bending portion, a damping portion, an elastic portion, or a ductile portion, but aspects of the present disclosure are not limited thereto.

A first surface of each of the plurality of first portions 511*a*1 and the plurality of second portions 511*a*2 may be connected to the first electrode layer 511*b* in common. A second surface of each of the plurality of first portions 511*a*1 and the plurality of second portions 511*a*2 may be connected to the second electrode layer 511*c* in common.

The plurality of first portions 511*a*1 and the plurality of second portion 511*a*2 may be disposed at (or connected to) a same plane, and thus, the vibration layer 511*a* according to another aspect of the present disclosure may implement a single thin film. Accordingly, the vibration part 511 or the vibration generating part 510 including the vibration layer 511*a* according to another aspect of the present disclosure may vibrate in vertically (or up and down) direction by the first portion 511*a*1 having a vibration characteristic and may be bent in a curved shape by the second portion 511*a*2 having flexibility.

Figure 16:
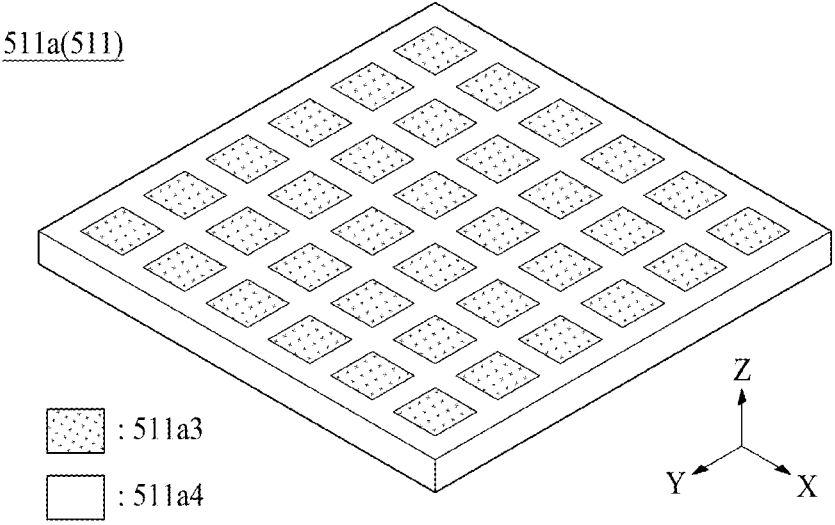
FIG. 16 is a diagram illustrating a vibration layer according to another aspect of the present disclosure.

FIG. 16 is a diagram illustrating a vibration layer according to another aspect of the present disclosure. FIG. 16 illustrates another aspect of the vibration layer according to another aspect of the present disclosure described above with reference to FIGS. 12 to 14.

Referring to FIGS. 13 and 16, the vibration layer 511*a* according to another aspect of the present disclosure may include a plurality of first portions 511*a*3 and a second portion 511*a*4 disposed between the plurality of first portions 511*a*3.

Each of the plurality of first portions 511*a*3 may be disposed to be spaced apart from one another along each of the first direction X and the second direction Y. For example, each of the plurality of first portions 511*a*3 may have a hexahedral shape having a same size and may be disposed in a lattice shape, but aspects of the present disclosure are not limited thereto. For example, each of the plurality of first portions 511*a*3 may include a circular shape plate, an oval shape plate, or a polygonal shape plate, which have a same size as each other, but aspects of the present disclosure are not limited thereto. For example, each of the plurality of first portions 511*a*3 may include a circular shape plate, an oval shape plate, or a polygonal shape plate, which have a different size from each other.

Each of the plurality of first portions 511*a*3 may include a material which is be substantially a same as the first portion 511*a*1 described above with reference to FIG. 15, and thus, repeated descriptions thereof are omitted.

The second portion 511*a*4 may be disposed between the plurality of first portions 511*a*3 along each of the first direction X and the second direction Y. The second portion 511*a*4 may be configured to fill a gap between two adjacent first portions 511*a*3 or to partially or fully surround each of the plurality of first portions 511*a*3, and thus, the second portion 511*a*4 may be connected to or attached on the first portion 511*a*3 adjacent thereto. The second portion 511*a*4 may be substantially a same as the second portion 511*a*2 described above with reference to FIG. 15, and thus, repeated descriptions thereof are omitted.

A first surface of each of the plurality of first portions 511*a*3 and the second portions 511*a*4 may be connected to the first electrode layer 511*b* in common. A second surface of each of the plurality of first portions 511*a*3 and the second portions 511*a*4 may be connected to the second electrode layer 511*c* in common.

The plurality of first portions 511*a*3 and the second portion 511*a*4 may be disposed at (or connected to) a same plane, and thus, the vibration layer 511*a* according to another aspect of the present disclosure may have a single thin film-type. Accordingly, the vibration part 511 or the vibration generating part 510 including the vibration layer 511*a* according to another aspect of the present disclosure may vibrate in vertically (or up and down) direction by the first portion 511*a*3 having a vibration characteristic and may be bent in a curved shape by the second portion 511*a*4 having flexibility.

Figure 17:
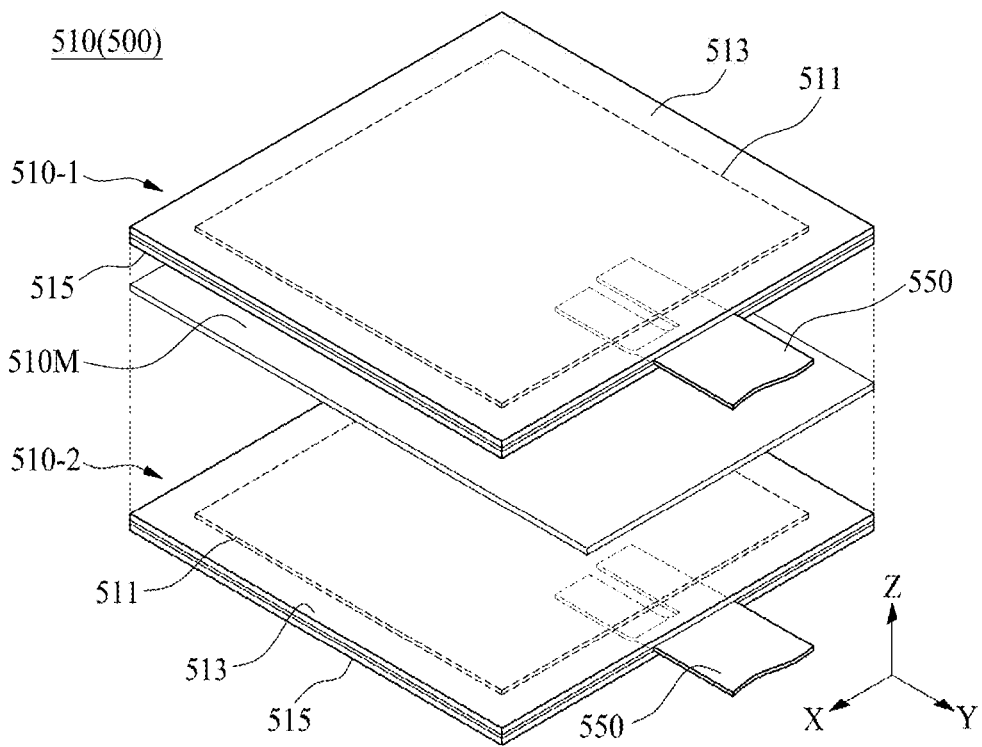
FIG. 17 is a diagram illustrating a vibration generating part according to another aspect of the present disclosure.

FIG. 17 is a diagram illustrating a vibration generating part according to another aspect of the present disclosure. FIG. 17 illustrates a vibration generating part of the vibration apparatus and the acoustic apparatus described above with reference to FIGS. 1 to 11.

Referring to FIGS. 12 and 17, a vibration generating part 510 of the vibration apparatus 500 according to another aspect of the present disclosure may include two or more vibration generating parts 510-1 and 510-2. For example, the vibration generating part 510 may include a first vibration generating part 510-1 and a second vibration generating part 510-2.

The first vibration generating part 510-1 and the second vibration generating part 510-2 may overlap or be stacked with each other to be displaced (or driven or vibrated) in a same direction to maximize or increase an amplitude displacement of the vibration apparatus 500, and/or an amplitude displacement of the display member 100. For example, the first vibration generating part 510-1 and the second vibration generating part 510-2 may have substantially a same size, but aspects of the present disclosure are not limited thereto. For example, the first vibration generating part 510-1 and the second vibration generating part 510-2 may have substantially a same size within an error range of a manufacturing process. Therefore, the first vibration generating part 510-1 and the second vibration generating part 510-2 may maximize or increase an amplitude displacement of the vibration apparatus 500, and/or an amplitude displacement of the display member 100.

According to an aspect of the present disclosure, any one of the first vibration generating part 510-1 and the second vibration generating part 510-2 may be connected or coupled to the vibration transfer part 530 by a connection member 560. For example, the first vibration generating part 510-1 may be connected or coupled to the vibration transfer part 530 by the connection member 560.

Each of the first vibration generating part 510-1 and the second vibration generating part 510-2 may be a same or substantially a same as the vibration generating part 510 described above with reference to FIGS. 12 to 16, and thus, repeated descriptions thereof are omitted.

The vibration generating part 510 of the vibration apparatus 500 according to another aspect of the present disclosure may further include an intermediate adhesive member 510M.

The intermediate adhesive member 510M may be disposed or connected between the first vibration generating part 510-1 and the second vibration generating part 510-2. For example, the intermediate adhesive member 510M may be disposed or connected between the second cover member 515 of the first vibration generating part 510-1 and the first cover member 513 of the second vibration generating part 510-2.

The intermediate adhesive member 510M according to another aspect of the present disclosure may be configured as a material including an adhesive layer which is good in attaching force or adhesive force, with respect to each of the first vibration generating part 510-1 and the second vibration generating part 510-2. For example, the intermediate adhesive member 510M may include a double-sided adhesive, a foam pad, a double-sided tape, a double-sided foam tape, a double-sided foam pad, or an adhesive, or the like, but aspects of the present disclosure are not limited thereto. For example, an adhesive layer of the intermediate adhesive member 510M may include epoxy, acrylic, silicone, or urethane, but aspects of the present disclosure are not limited thereto. For example, the adhesive layer of the intermediate adhesive member 510M may include a urethane-based material (or substance) having relatively ductile characteristic. Accordingly, the vibration loss caused by displacement interference between the first vibration generating part 510-1 and the second vibration generating part 510-2 may be minimized or reduced, or each of the first vibration generating part 510-1 and the second vibration generating part 510-2 may be freely displaced (or vibrated or driven).

The vibration generating part 510 of the vibration apparatus 500 according to another aspect of the present disclosure may include the first vibration generating part 510-1 and the second vibration generating part 510-2 which are stacked to vibrate (or displace or drive) in a same direction, and thus, the amount of displacement and/or an amplitude displacement may be maximized or increased. Accordingly, the amount of displacement (or a bending force) and/or an amplitude displacement of the display member 100 may be maximized or increased.

Figure 18:
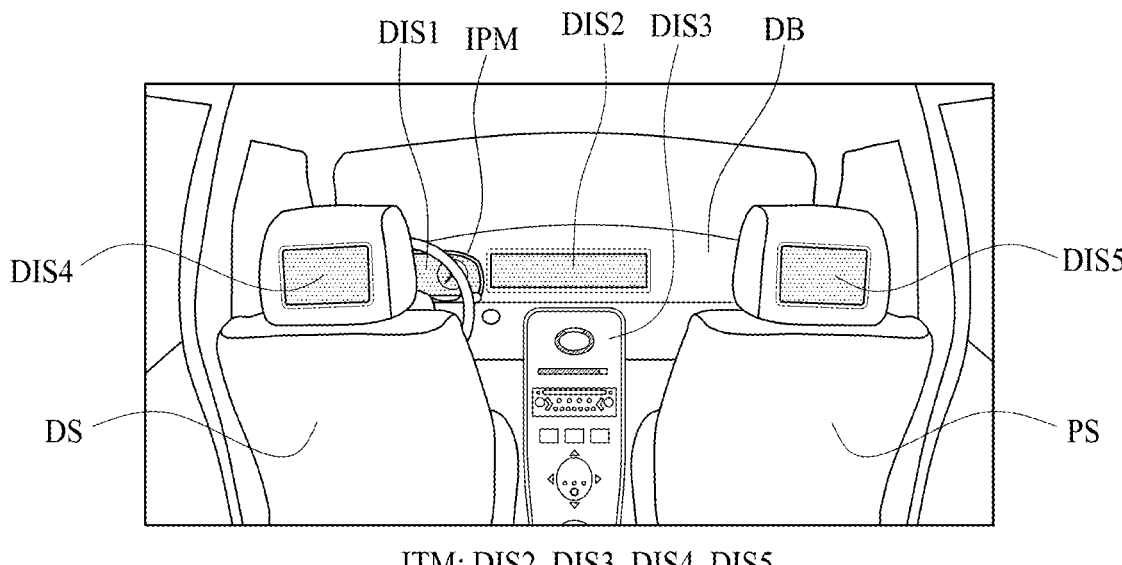
FIG. 18 is a diagram illustrating a vehicular apparatus according to an aspect of the present disclosure.

FIG. 18 is a diagram illustrating a vehicular apparatus according to an aspect of the present disclosure. FIG. 18 illustrates an aspect where the display apparatus described above with reference to FIGS. 1 to 17 according to an aspect of the present disclosure is applied to a vehicular apparatus (or a vehicle).

Referring to FIG. 18, a vehicular apparatus according to an aspect of the present disclosure may include a dashboard DB, an instrument panel module IPM, and an infotainment module ITM.

The dashboard DB may include a first region facing a driver seat DS, a second region facing a passenger seat PS, and a third region between the first region and the second region. The dashboard DB may include a center fascia region between the driver seat DS and the passenger seat PS.

The instrument panel module IPM may include a first display DIS1 disposed at the first region of the dashboard DB. The first display DIS1 may be an instrument panel display. For example, the first display DIS1 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The first display DIS1 may provide a driver with various information such as driving-related information or the like such as velocity (or speed), fuel amount, and revolutions per minute (RPM) of the vehicle.

The first display DIS1 may include the display apparatus described above with reference to FIGS. 1 to 17, and thus, repeated descriptions thereof are omitted. Accordingly, the first display DIS1 may be configured to display an image corresponding to information provided from a host system, on the display panel. For example, one or more vibration apparatuses 500 may be configured at a rear surface of the first display DIS1. Moreover, the first display DIS1 may provide a user with an ultrasonic vibration or an ultrasonic haptic based on driving (or vibration) of the vibration apparatus when a driver (or user) touch is applied thereto. Furthermore, when the first display DIS1 includes the display apparatus described above with reference to FIG. 21, the first display DIS1 may directly output a sound, generated by a display member which vibrates based on driving (or vibration) of an acoustic apparatus based on a sound signal supplied from an audio system and/or a multimedia system, to a driver.

The infotainment ITM (or an infotainment system) may include one or more infotainment displays which is at one or more of the dashboard DB, the driver seat DS, and the passenger seat PS. For example, the infotainment ITM may include one or more second displays which is configured at one or more of the dashboard DB, the driver seat DS, and the passenger seat PS. For example, the infotainment ITM may include second to fifth displays DIS2 to DIS5.

The second display DIS2 may be disposed or configured at the third region of the dashboard DB. For example, the second display DIS2 may have a length that is enlarged toward the second region PA of the dashboard DB. For example, the second display DIS2 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The second display DIS2 may be respectively connected to a navigation system and a convenience system including an audio system, an air conditioning system, and a multimedia system or the like, and may display various information provided from the convenience system and the navigation system.

The second display DIS2 may include the display apparatus described above with reference to FIGS. 1 to 17, and thus, repeated descriptions thereof are omitted. Accordingly, the second display DIS2 may be configured to display the various information provided from the convenience system and the navigation system, on the display panel. Moreover, the second display DIS2 may transmit or receive image information or sound information through wireless communication with a wireless communication device of a passenger sitting on a passenger seat and may be configured to display the received image information on a display panel.

For example, one or more the vibration apparatuses 500 may be configured at a rear surface of the second display DIS2. The second display DIS2 may provide a user with an ultrasonic vibration or an ultrasonic haptic based on driving (or vibration) of the vibration apparatus when a driver (or user) touch is applied thereto.

According to another aspect of the present disclosure, the second display DIS2 and the first display DIS1 may be configured as one display and may be disposed at the first region and the third region of the dashboard DB or may be disposed across the first to third regions of the dashboard DB.

The third display DIS3 may be disposed at the center fascia region under the third region of the dashboard DB. For example, the third display DIS3 may be disposed under the second display DIS2. The third display DIS3 may be disposed at the center fascia region which is at a region between the driver seat DS and the passenger seat PS. For example, the third display DIS3 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The third display (or center fascia display) DIS3 may be configured to display various information provided from the convenient system. The third display DIS3 and the second display DIS2 may share the various information displayed on a display panel.

The third display DIS3 may include the display apparatus described above with reference to FIGS. 1 to 17, and thus, repeated descriptions thereof are omitted. Accordingly, the third display DIS3 may be configured to display the various information provided from the convenience system, on the display panel. For example, one or more vibration apparatuses 500 may be configured at a rear surface of the third display DIS3. Moreover, the third display DIS3 may provide a user with an ultrasonic vibration or an ultrasonic haptic based on driving (or vibration) of the vibration apparatus when a driver (or user) touch is applied thereto.

The fourth display DIS4 may be disposed or buried in a headrest of the driver seat DS. The fifth display DIS5 may be disposed or buried in a headrest of the passenger seat PS. For example, the fourth display DIS4 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto. For example, the fifth display DIS5 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The fourth and fifth display DIS4 and DIS5 may include the display apparatus described above with reference to FIGS. 1 to 17, and thus, repeated descriptions thereof are omitted.

Each of the fourth and fifth displays DIS4 and DIS5 may share a function of the second display DIS2. Moreover, each of the fourth and fifth displays DIS4 and DIS5 may transmit or receive image information or sound information through wireless communication with a wireless communication device of a passenger, and may display the received image information on a display panel.

For example, one or more vibration apparatuses 500 may be configured at a rear surface of each of the fourth and fifth displays DIS4 and DIS5. Each of the fourth and fifth displays DIS4 and DIS5 may provide a user with an ultrasonic vibration and/or an ultrasonic haptic based on driving (or vibration) of the vibration apparatus when a driver (or user) touch is applied thereto.

The vehicular apparatus according to an aspect of the present disclosure may provide a user with an ultrasonic vibration or an ultrasonic haptic when a user touch is applied to each of the first to fifth displays DIS1 to DIS5, may use each of the first to fifth displays DIS1 to DIS5 as a speaker for a sound output, and may provide a driver and/or a passenger with a 2 or more-channel stereophonic sound by using a sound generated (or output) from each of the first to fifth displays DIS1 to DIS5.

Figure 19A:
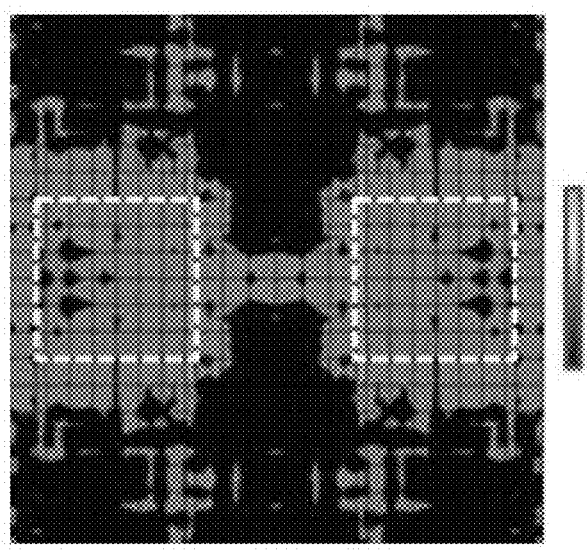
FIGS. 19A and 19B are diagrams showing a vertical displacement of a vibration apparatus according to an aspect of the present disclosure and an experiment example.
Figure 19B:
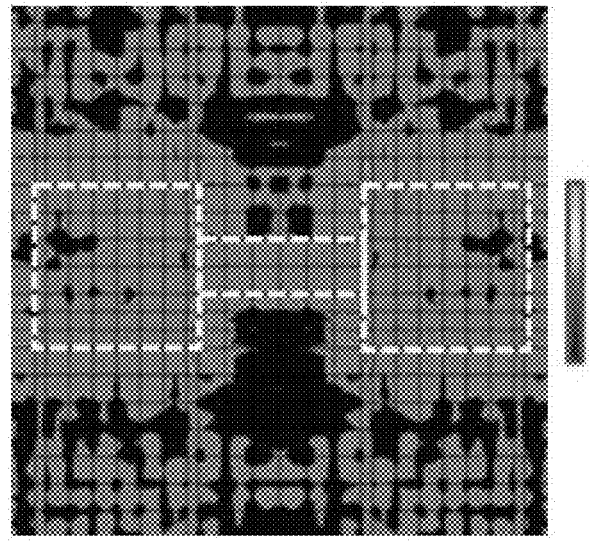

FIGS. 19A and 19B are diagrams showing a vertical displacement of a vibration apparatus according to an aspect of the present disclosure and an experiment example.

The inventors have measured a vibration valid area according to the experiment example and a vibration valid area according to an aspect by using a simulation so as to check a vertical displacement of a vibration apparatus according to aspects of the present disclosure. For example, the vertical displacement may be the amount of variation where a vibration apparatus vibrates vertically. For example, when a vibration strength of the vibration apparatus is large, the vertical displacement may be large, and when the vibration strength of the vibration apparatus is small, the vertical displacement may be small. For example, a region, where a vibration is generated, of the vibration apparatus may progressively increase as a vibration valid area of the vibration apparatus increases. In the experiment example, a sample has been prepared so that a connection portion is not configured in the vibration apparatus (illustrated by a dotted line) described above with reference to FIG. 2. In an aspect, a sample has been prepared to be equal to the vibration apparatus (illustrated by the dotted line) described above with reference to FIG. 2. In the experiment example and an aspect, a size of each of a plurality of vibration transfer parts has been identically configured to be 30 mm in width and 30 mm in height, a size of each of a plurality of vibration generating parts has been identically configured to be 30 mm in width and 30 mm in height, and a size of a vibration member has been identically configured to be 100 mm in width and 100 mm in height. In an aspect, a width of a connection portion has been prepared to be 10 mm, and a length of the connection portion has been prepared to be 30 mm. A size of the vibration transfer part and a width and a length of the connection portion do not limit the details of the present disclosure. FIG. 19A shows a simulation result according to the experiment example, and FIG. 19B shows a simulation result according to an aspect. In FIGS. 19A and 19B, a vertical displacement (or strength of a vibration) of the vibration apparatus appears to be close to red as increasing, and the vertical displacement (or strength of a vibration) of the vibration apparatus appears to be close to blue as decreasing.

Referring to FIGS. 19A and 19B, comparing with the experiment example, it may be seen that a vibration valid area of a vibration apparatus according to an aspect of the present disclosure, where a connection portion is configured, increases by 50% or more. The vibration valid area may be an area of a portion illustrated in yellow-green in the drawing. Accordingly, in an aspect of the present disclosure, because the connection portion is configured, it may be seen that the vibration valid area of the vibration apparatus increases, and a vertical displacement is enhanced.

Therefore, the vibration apparatus according to an aspect of the present disclosure may vibrate a display member by using the connection portion connecting a plurality of vibration transfer parts with each other, and thus, may more effectively provide a user with an ultrasound vibration and/or an ultrasound haptic.

Figure 20A:
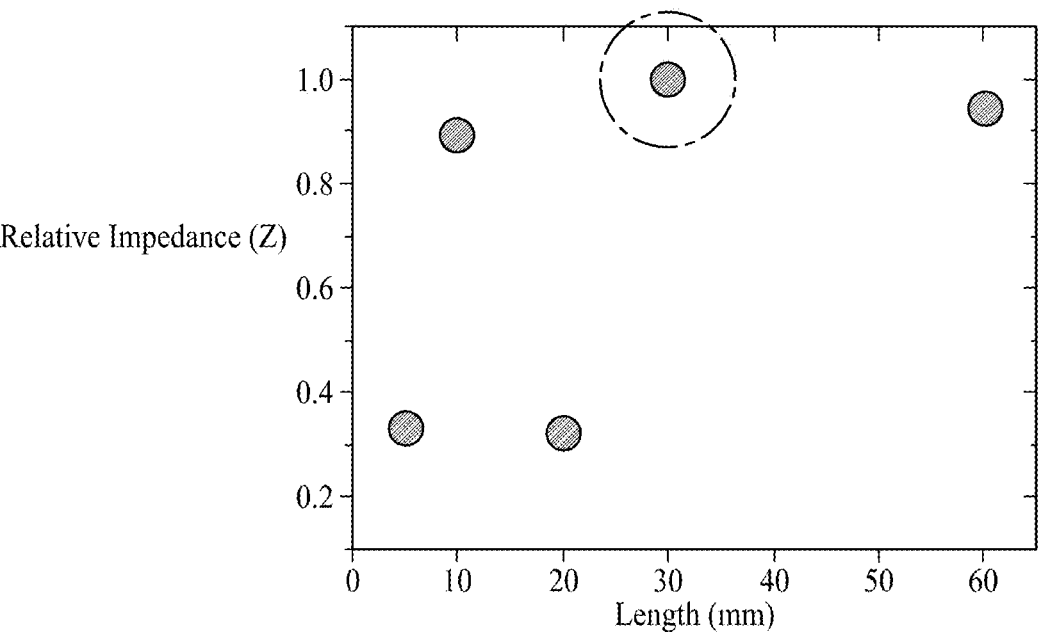
FIGS. 20A and 20B are diagrams showing a relative impedance with respect to a width and a length of a connection portion according to an aspect of the present disclosure.
Figure 20B:
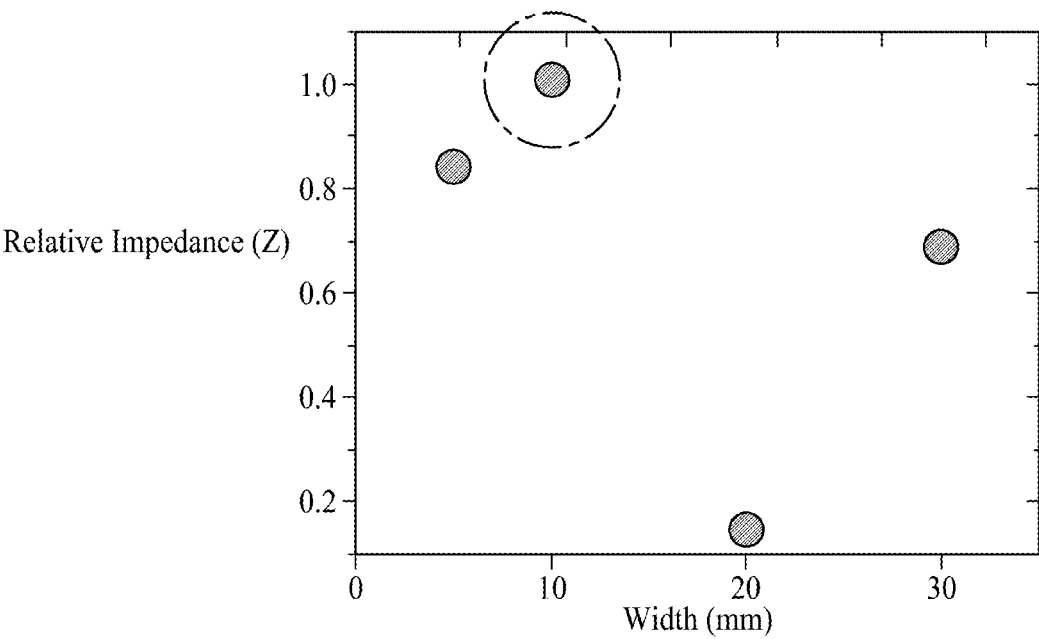

FIGS. 20A and 20B are diagrams showing a relative impedance with respect to a width and a length of a connection portion according to an aspect of the present disclosure. FIG. 20A shows a result obtained by measuring a relative impedance with respect to 30 mm in length of a connection portion, and FIG. 20B shows a result obtained by measuring a relative impedance with respect to 10 mm in width of the connection portion. An impedance may be a resistance of a vibration apparatus driving an ultrasound. A vibration displacement of a vibration apparatus may increase as a resistance decreases. FIGS. 20A and 20B show a relative magnitude with respect to a relative impedance, and an impedance which is a criterion is "−", and thus, is represented by "+" in FIGS. 20A and 20B.

Referring to FIG. 20A, when a length of the connection portion according to an aspect of the present disclosure is 30 mm, the connection portion has an impedance value of 1.0 (illustrated by a circle in the drawing). According to an aspect of the present disclosure, with respect to a case where the length of the connection portion is 30 mm, the relative impedance value deviates from 1.0 as the length of the connection portion decreases to 20 mm, 10 mm, and 5 mm. Therefore, it may be seen that the relative impedance value increases as the length of the connection portion is reduced. Accordingly, because the relative impedance value increases as the length of the connection portion is reduced, it may be seen that a resistance increases.

According to an aspect of the present disclosure, with respect to a case where the length of the connection portion is 30 mm, the relative impedance value is close to 1.0 even when the length of the connection portion increases to 60 mm, and thus, it may be seen that a variation of the relative impedance value is small. Therefore, because the relative impedance value is close to 1.0 even when the length of the connection portion increases, it may be seen that a resistance is not largely changed. Accordingly, the length of the connection portion according to an aspect of the present disclosure may be set to 30 mm or more.

Referring to FIG. 20B, when a width of the connection portion according to an aspect of the present disclosure is 10 mm, the connection portion has an impedance value of 1.0 (illustrated by a circle in the drawing). With respect to a case where the width of the connection portion is 10 mm, the relative impedance value deviates from 1.0 as the width of the connection portion increases to 20 mm and 30 mm. Therefore, it may be seen that the relative impedance value increases as the width of the connection portion increases. Accordingly, because the relative impedance value increases as the width of the connection portion increases, it may be seen that a resistance increases.

According to an aspect of the present disclosure, with respect to a case where the width of the connection portion is 10 mm, the relative impedance value is close to 1.0 even when the width of the connection portion decreases to 5 mm, and thus, it may be seen that a variation of the relative impedance value is small. Therefore, because the relative impedance value is close to 1.0 even when the width of the connection portion decreases, it may be seen that a resistance is not largely changed. Accordingly, the width of the connection portion according to an aspect of the present disclosure may be set to 10 mm or less.

A vibration apparatus, a display apparatus including the same, and a vehicular apparatus including the vibration apparatus according to one or more example aspects of the present disclosure are described below.

A vibration apparatus according to one or more aspects of the present disclosure may comprise a plurality of vibration transfer parts, a connection portion connected between the plurality of vibration transfer parts, and a plurality of vibration generating parts connected between two adjacent vibration transfer parts of the plurality of vibration transfer parts.

According to one or more aspects of the present disclosure, each of the plurality of vibration transfer parts may be configured to change an in-plane vibration mode of the plurality of vibration generating parts to an out-plane vibration mode.

According to one or more aspects of the present disclosure, the connection portion may have a width and a length, which are less than a width and a length of each of the plurality of vibration transfer parts.

According to one or more aspects of the present disclosure, the width of the connection portion may be less than the length of the connection portion.

According to one or more aspects of the present disclosure, the length of the connection portion may be two or more times the width of the connection portion.

According to one or more aspects of the present disclosure, each of the plurality of vibration transfer parts may comprise a base member, and a vibration transfer member connected to the base member. The connection portion may be connected to the base member of each of two adjacent vibration transfer parts.

According to one or more aspects of the present disclosure, the connection portion may comprise the same material as a material of the base member.

According to one or more aspects of the present disclosure, the vibration transfer member may comprise a first vibration transfer member configured at one edge of the base member, and a second vibration transfer member configured at the other edge of the base member facing the first vibration transfer member.

According to one or more aspects of the present disclosure, each of the first vibration transfer member and the second vibration transfer member may be protruded from the base member.

According to one or more aspects of the present disclosure, each of the first vibration transfer member and the second vibration transfer member may have a line shape.

According to one or more aspects of the present disclosure, the vibration apparatus may further comprise an adhesive member between the vibration generating part and the base member.

According to one or more aspects of the present disclosure, the vibration generating part may comprise a first cover member, a second cover member, and a vibration part between the first cover member and the second cover member, the vibration part including a piezoelectric material.

According to one or more aspects of the present disclosure, the vibration generating part may further comprise a signal supply member electrically connected to the vibration part. A portion of the signal supply member may be accommodated between the first cover member and the second cover member.

According to one or more aspects of the present disclosure, the vibration generating part may comprise a first vibration generating part, a second vibration generating part stacked on the first vibration generating part, and a middle member between the first vibration generating part and the second vibration generating part. One of the first vibration generating part and the second vibration generating part is connected to the vibration transfer part.

According to one or more aspects of the present disclosure, each of the first and second vibration generating parts may comprise a first cover member, a second cover member, and a vibration part between the first cover member and the second cover member, the vibration part including a piezoelectric material.

According to one or more aspects of the present disclosure, each of the first and second vibration generating parts further may comprise a signal supply member electrically connected to the vibration part. A portion of the signal supply member may be accommodated between the first cover member and the second cover member.

A display apparatus according to one or more aspects of the present disclosure may comprise a display member configured to display an image, a vibration generating apparatus including one or more vibration apparatuses configured to vibrate the display member, and a connection member between the display member and the vibration generating apparatus. The one or more vibration apparatuses may comprise a plurality of vibration transfer parts, a connection portion connected between the plurality of vibration transfer parts, and a plurality of vibration generating parts connected between two adjacent vibration transfer parts of the plurality of vibration transfer parts.

According to one or more aspects of the present disclosure, the vibration generating apparatus may comprise a plurality of vibration apparatuses, and at least some of the plurality of vibration apparatuses may comprise a different number of vibration transfer parts and vibration generating parts.

According to one or more aspects of the present disclosure, the one or more vibration apparatuses may vibrate the display member to generate an ultrasound vibration at a surface of the display member, based on a driving signal.

According to one or more aspects of the present disclosure, the one or more vibration apparatuses may be connected to a rear surface of the display member with an air gap therebetween.

According to one or more aspects of the present disclosure, the display member may comprise a display panel including a plurality of pixels configured to display the image, and a touch panel connected to the display panel.

According to one or more aspects of the present disclosure, the display member may comprise a front member, a display panel at a rear surface of the front member, the display panel including a plurality of pixels configured to display the image, and a touch panel between the front member and the display panel.

A vehicular apparatus according to one or more aspects of the present disclosure may comprise a dashboard, an instrument panel module in the dashboard, the instrument panel module including a first display, a driver seat, a front passenger seat, and an infortainment module in one or more of the dashboard, the driver seat, and the front passenger seat, and the infortainment module including one or more second displays. One or more of the first display and the one or more second displays may comprise a display member configured to display an image, one or more vibration generating apparatuses configured to vibrate the display member, and a connection member between the display member and the one or more vibration generating apparatuses. The one or more vibration generating apparatuses may comprise a plurality of vibration transfer parts, a connection portion connected between the plurality of vibration transfer parts, and a plurality of vibration generating parts connected between two adjacent vibration transfer parts of the plurality of vibration transfer parts.

According to one or more aspects of the present disclosure, the one or more vibration generating apparatuses may vibrate the display member to generate an ultrasound vibration at a surface of the display member, based on a driving signal.

According to one or more aspects of the present disclosure, the driving signal may be an amplitude modulation signal of an ultrasound signal using a low frequency signal.

According to one or more aspects of the present disclosure, the display member may comprise a display panel including a plurality of pixels configured to display the image, and a touch panel connected to the display panel.

According to one or more aspects of the present disclosure, the display member may comprise a front member, a display panel at a rear surface of the front member, the display panel including a plurality of pixels configured to display the image, and a touch panel between the front member and the display panel.

A vibration apparatus according to one or more example aspects of the present disclosure may be applied to or included in a vibration generating apparatus and/or a sound generating apparatus provided in an apparatus. The vibration apparatus and apparatus comprising the same according to one or more example aspects of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. In addition, the vibration apparatus according to some example aspects of the present disclosure may be applied to or included in organic light-emitting lighting apparatuses or inorganic light-emitting lighting apparatuses. When the vibration apparatus of one or more example aspects of the present disclosure is applied to or included in lighting apparatuses, the vibration apparatus may act as a lighting device and a speaker. In addition, when the vibration apparatus according to some example aspects of the present disclosure is applied to or included in a mobile device, or the like, the vibration apparatus may be one or more of a speaker, a receiver, and a haptic device, but aspects of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:
a display member including a display panel including a plurality of pixels configured to display an image and a touch panel connected to the display panel;
a supporting member disposed at a rear surface of the display panel;
a vibration generating apparatus including one or more vibration apparatuses configured to vibrate the display member; and
a connection member between the rear surface of the display panel and the vibration generating apparatus,
wherein each of the one or more vibration apparatuses includes:
a plurality of vibration transfer parts;

a connection portion connected between the plurality of vibration transfer parts, the connection portion spaced apart from the display panel and the touch panel; and
a plurality of vibration generating parts connected to each of the plurality of vibration transfer parts,
wherein each of the plurality of vibration transfer parts comprises:
a base member; and
a vibration transfer member protruded from an edge of the base member to have a line shape,
wherein the connection portion is connected to a side surface of the base member of each of two adjacent vibration transfer parts, is not connected to each of the display panel and the supporting member in a thickness direction of the display panel, and is vertically non-overlapping with each of the plurality of vibration generating parts.

2. The display apparatus of claim 1, wherein the vibration generating apparatus comprises a plurality of vibration apparatuses, and
at least some of the plurality of vibration apparatuses comprise a different number of vibration transfer parts and vibration generating parts.

3. The display apparatus of claim 1, wherein the one or more vibration apparatuses vibrates the display member to generate an ultrasound vibration at a surface of the display member, based on a driving signal.

4. The display apparatus of claim 1, wherein the one or more vibration apparatuses are connected to a rear surface of the display member with an air gap therebetween.

5. The display apparatus of claim 1, wherein each of the plurality of vibration transfer parts is configured to change an in-plane vibration mode of the plurality of vibration generating parts to an out-plane vibration mode.

6. The display apparatus of claim 1, wherein a width of the connection portion is less than a length of the connection portion.

7. The display apparatus of claim 1, wherein the length of the connection portion is two or more times the width of the connection portion.

8. The display apparatus of claim 1, wherein the connection portion comprises a material that is the same as a material of the base member.

9. The display apparatus of claim 1, wherein the vibration transfer member comprises:
a first vibration transfer member configured at one edge of the base member; and
a second vibration transfer member configured at the other edge of the base member facing the first vibration transfer member.

10. The display apparatus of claim 9, wherein each of the first vibration transfer member and the second vibration transfer member protrudes from the base member.

11. The display apparatus of claim 9, wherein each of the first vibration transfer member and the second vibration transfer member has a line shape.

12. The display apparatus of claim 1, further comprising an adhesive member between the vibration generating part and the base member.

13. The display apparatus of claim 1, wherein the vibration generating part comprises:
a first cover member;
a second cover member; and
a vibration part between the first cover member and the second cover member, the vibration part including a piezoelectric material.

14. The display apparatus of claim 13, wherein the vibration generating part further comprises a signal supply member electrically connected to the vibration part, and a portion of the signal supply member is accommodated between the first cover member and the second cover member.

15. The display apparatus of claim 1, wherein the vibration generating part comprises:

a first vibration generating part;

a second vibration generating part stacked on the first vibration generating part; and a middle member between the first vibration generating part and the second vibration generating part, wherein one of the first vibration generating part and the second vibration generating part is connected to the vibration transfer part.

16. The display apparatus of claim 15, wherein each of the first and second vibration generating parts comprises:

a first cover member;

a second cover member; and a vibration part between the first cover member and the second cover member, the vibration part including a piezoelectric material.

17. The display apparatus of claim 16, wherein each of the first and second vibration generating parts further comprises a signal supply member electrically connected to the vibration part, and a portion of the signal supply member is accommodated between the first cover member and the second cover member.

* * * * *